US011934228B2

(12) United States Patent
Jung et al.

(10) Patent No.: US 11,934,228 B2
(45) Date of Patent: Mar. 19, 2024

(54) METHOD FOR PROVIDING IMAGE USING FOLDABLE DISPLAY AND ELECTRONIC DEVICE FOR SUPPORTING THE SAME

(71) Applicant: Samsung Electronics Co., Ltd., Gyeonggi-do (KR)

(72) Inventors: Jongwoo Jung, Gyeonggi-do (KR); Insik Myung, Gyeonggi-do (KR); Jiin Baek, Gyeonggi-do (KR); Hyunjin Han, Gyeonggi-do (KR); Dasom Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/560,850

(22) Filed: Dec. 23, 2021

(65) Prior Publication Data
US 2022/0113767 A1  Apr. 14, 2022

Related U.S. Application Data

(63) Continuation of application No. 16/738,587, filed on Jan. 9, 2020, now Pat. No. 11,209,865.

(30) Foreign Application Priority Data

Jan. 10, 2019 (KR) .......................... 10-2019-0003092

(51) Int. Cl.
*G06F 1/16* (2006.01)
*G06F 3/03* (2006.01)
(Continued)

(52) U.S. Cl.
CPC .......... *G06F 1/1652* (2013.01); *G06F 1/1677* (2013.01); *G06F 3/03* (2013.01);
(Continued)

(58) Field of Classification Search
CPC .................................................. G06F 3/04883
See application file for complete search history.

(56) References Cited

U.S. PATENT DOCUMENTS 9,075,568 B1 *  7/2015  Gray .................... G06F 3/0488
D789,925 S      6/2017  Browning et al.
(Continued)

FOREIGN PATENT DOCUMENTS

AU    2015297281    7/2015
EP    3 413 547     12/2018
(Continued)

OTHER PUBLICATIONS

International Search Report dated Apr. 29, 2020 issued in counterpart application No. PCT/KR2020/000415, 9 pages.
(Continued)

*Primary Examiner* — Nan-Ying Yang
(74) *Attorney, Agent, or Firm* — The Farrell Law Firm, P.C.

(57) ABSTRACT

An electronic device includes a housing including a first housing and a second housing; a hinge unit configured to rotate the first housing and the second housing, the housing configured to move between a folded state and an unfolded state via the hinge unit; a first display disposed in a first area of the first housing and a second area of the second housing; a second display disposed in a third area of the first housing, located at an opposite side of the first area; at least one sensor; a memory configured to store an image frame set including a plurality of image frames; and at least one processor; wherein the memory stores instructions which, when executed, cause the at least one processor to obtain, via the at least one sensor, information corresponding to a folding angle between the first housing and the second housing, based on the obtained information corresponding to a first folding angle being smaller than a first reference
(Continued)

angle, deactivate the first display and display, via the second display, an image frame included in the image frame set, based on the obtained information corresponding to a second folding angle being greater than the first reference angle, deactivate the second display and control to activate the first display, and based on the obtained information corresponding to a folding angle increasing from the second folding angle to a third folding angle, display, via the first display, image frames included in the image frame set corresponding to a plurality of folding angles between the second folding angle to the third folding angle.

20 Claims, 26 Drawing Sheets

(51) Int. Cl.
  *G06F 3/0487* (2013.01)
  *G09F 9/30* (2006.01)
  *H04M 1/02* (2006.01)

(52) U.S. Cl.
  CPC ............ *G06F 3/0487* (2013.01); *G09F 9/301* (2013.01); *H04M 1/0243* (2013.01); *H04M 1/0268* (2013.01); *G06F 2203/04803* (2013.01); *H04M 1/0214* (2013.01); *H04M 2250/22* (2013.01)

(56) References Cited

U.S. PATENT DOCUMENTS

| | | | |
|---|---|---|---|
| 10,488,947 | B2 | 11/2019 | Kwon et al. |
| 2016/0034047 | A1* | 2/2016 | Lee .................... G06F 3/013 345/156 |
| 2016/0132074 | A1* | 5/2016 | Kim ..................... G06F 1/1652 345/173 |
| 2017/0075640 | A1* | 3/2017 | Chun .................... G06F 3/0481 |
| 2017/0229100 | A1 | 8/2017 | Chun |
| 2017/0293383 | A1 | 10/2017 | Lee et al. |
| 2018/0129250 | A1 | 5/2018 | La et al. |
| 2018/0330535 | A1 | 11/2018 | Hawthorne |

FOREIGN PATENT DOCUMENTS

| | | |
|---|---|---|
| KR | 10-2011-0058879 | 6/2011 |
| KR | 10-2016-0016521 | 2/2016 |
| KR | 1020160055646 | 5/2016 |
| KR | 20160150533 | 12/2016 |
| KR | 10-2017-0085317 | 7/2017 |
| KR | 300806729 | 7/2017 |
| KR | 1020170093658 | 8/2017 |
| KR | 20180050631 | 5/2018 |

OTHER PUBLICATIONS

European Search Report dated Nov. 30, 2021 issued in counterpart application No. 20738929.7-1216, 8 pages.
European Search Report dated May 25, 2022 issued in counterpart application No. 20738929.7-1224, 4 pages.
European Search Report dated Dec. 6, 2022 issued in counterpart application No. 20738929.7-1224, 6 pages.
European Search Report dated Jun. 7, 2023 issued in counterpart application No. 20738929.7-1224, 6 pages.
Chinese Office Action dated Aug. 30, 2023 issued in counterpart application No. 202080019318.8, 18 pages.
Korean Office Action dated Dec. 26, 2023 issued in counterpart application No. 10-2019-0003092, 16 pages.
European Search Report dated Jan. 11, 2024 issued in counterpart application No. 20738929.7-1224, 8 pages.

* cited by examiner

METHOD FOR PROVIDING IMAGE USING FOLDABLE DISPLAY AND ELECTRONIC DEVICE FOR SUPPORTING THE SAME

CROSS-REFERENCE TO RELATED APPLICATION(S)

This application is a Continuation application of U.S. patent application Ser. No. 16/738,587, filed on Jan. 9, 2020, in the United States Patent and Trademark Office, which is based on and claims priority under 35 U.S.C. § 119 to Korean Patent Application No. 10-2019-0003092, filed on Jan. 10, 2019, in the Korean Intellectual Property Office, the disclosures of which are incorporated by reference herein in their entireties.

BACKGROUND

1. Field

The disclosure relates to a method for providing an image using a foldable display and an electronic device for supporting the same.

2. Description of Related Art

Recently, electronic devices including a foldable display are being developed. The electronic device including the foldable display, which is carried in a folded state, may provide improved portability. In addition, the electronic device including the foldable display may provide a wide screen.

If a conventional electronic device including the foldable display is folded or unfolded, a first display displays a first image or a second display displays a second display which is not associated with (or not related to) the first image.

SUMMARY

An aspect of the present disclosure provides a method for providing an image which dynamically changes, using a plurality of displays (or different portions of a foldable display) while an electronic device including a foldable display is folded or unfolded, and the electronic device for supporting the same.

In accordance with an aspect of the present disclosure, an electronic device is provided. The electronic device includes a housing including a first housing and a second housing; a hinge unit configured to rotate the first housing and the second housing, the housing configured to move between a folded state and an unfolded state via the hinge unit; a first display disposed in a first area of the first housing and a second area of the second housing; a second display disposed in a third area of the first housing, located at an opposite side of the first area at least one sensor; a memory configured to store an image frame set including a plurality of image frames; and at least one processor; wherein the memory stores instructions which, when executed, cause the at least one processor to obtain, via the at least one sensor, information corresponding to a folding angle between the first housing and the second housing, based on the obtained information corresponding to a first folding angle being smaller than a first reference angle, deactivate the first display and display, via the second display, an image frame included in the image frame set, based on the obtained information corresponding to a second folding angle being greater than the first reference angle, deactivate the second display and control to activate the first display, and based on the obtained information corresponding to a folding angle increasing from the second folding angle to a third folding angle, display, via the first display, image frames included in the image frame set corresponding to a plurality of folding angles between the second folding angle to the third folding angle.

In accordance with another aspect of the present disclosure, a method is provided. The method includes obtaining, via at least one sensor of the electronic device, information corresponding to a folding angle between a first housing and a second housing of the electronic device; based on the obtained information corresponding to a first folding angle being smaller than a first reference angle, deactivating a first display and displaying, via a second display, an image frame included in an image frame set, wherein the first display is disposed in a first area of the first housing and a second area of the second housing, and wherein the second display is disposed in a third area of the first housing, located at an opposite side of the first side; based on the obtained information corresponding to a second folding angle being greater than the first reference angle, deactivating the second display and activating the first display; and based on the obtained information corresponding to a folding angle increasing from the second folding angle to a third folding angle, displaying, via the first display, image frames included in the image frame set corresponding to a plurality of folding angles between the second folding angle to the third folding angle.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
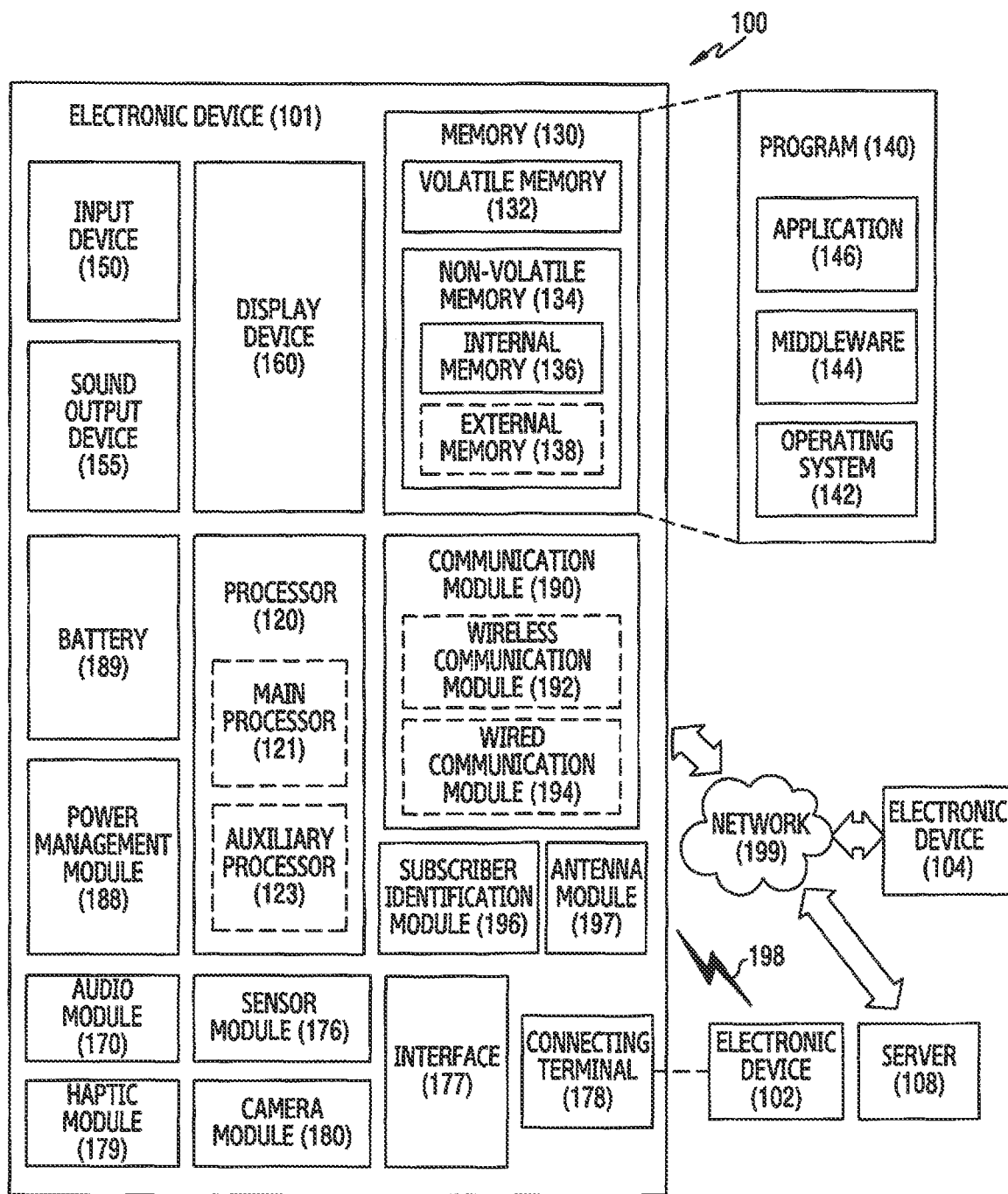
FIG. 1 illustrates a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, the hologram device, and the projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via the user's tactile sensation or kinesthetic sensation. The haptic module 179 may include, for example, a motor, a piezoelectric element, or an electrical stimulator.

The camera module 180 may capture a still image or moving images. The camera module 180 may include one or more lenses, image sensors. ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and perform communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 102, the electronic device 104, or the server 108 via the first network 198 (e.g., a short-range communication network, such as Bluetooth™, wireless-fidelity (Wi-Fi) direct, or by a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., the external electronic device 102, the electronic device 104, or the server 108) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101. All or some of operations to be executed at the electronic device 101 may be executed at one or more of the external electronic device 102, the external electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of performing the at least part of the function or the service or an additional function or an additional service to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

The terms used herein are not intended to limit present disclosure but include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$," "2nd," "first," and "second" may be used to simply distinguish a corresponding component from another, but does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". The term "module" may refer to a single integral component, or a minimum unit or part thereof, adapted to perform one or more functions. For example, the term "module" may refer to a component implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor 120 of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the present disclosure may be included and provided in a computer program product. The computer program product may be traded as a product between a seller and a buyer. The computer program product may be distributed in the form of a non-transitory machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the non-transitory machine-readable storage medium, such as memory of the manufacturers server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
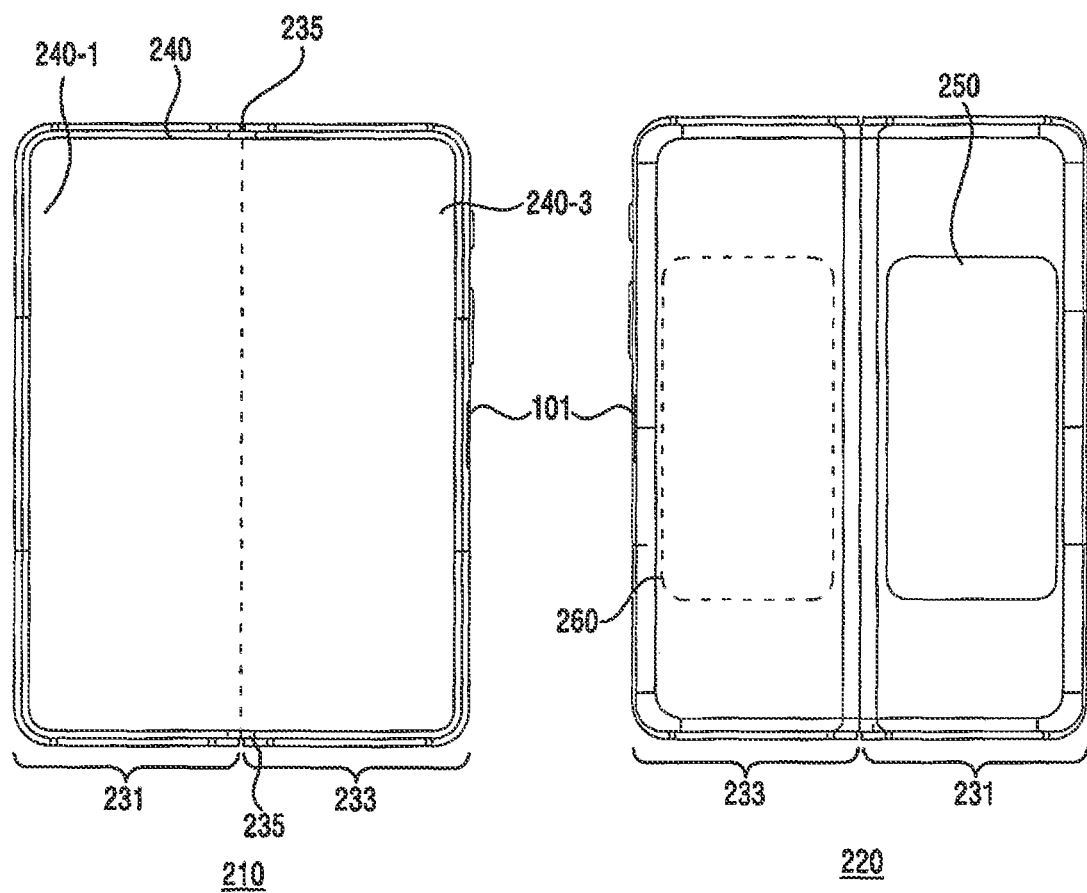
FIG. 2 illustrates a front view and a rear view of an electronic device which is unfolded according to an embodiment.

FIG. 2 illustrates a front view 210 and a rear view 220 of an electronic device 101 which is unfolded according to an embodiment.

Referring to FIG. 2, the front view 210 of the unfolded electronic device 101 and the rear view 220 of the unfolded electronic device 101 are shown. For example, the front view 210 of the electronic device 101 is fully unfolded and the rearview 220 of the electronic device 101 is fully unfolded.

The electronic device 101 may include a first housing 231, a second housing 233, a hinge unit 235, a first display 240, and a second display 250.

The first housing 231 and the second housing 233 may be coupled. For example, one side of the first housing 231 and one side of the second housing 233 may be coupled. The first housing 231 and the second housing 233 may be coupled by the hinge unit 231. The first housing 231 and the second housing 233 may be coupled pivotably or rotatably based on the hinge unit 235.

The first display 240 may be exposed to outside through a first area of the first housing 231 and a second area of the second housing 233. For example, the first display 240 may be disposed on the first housing 231 and the second housing 233 across the hinge unit 235.

The first display 240 may be a foldable display. The first display 240 may be folded or unfolded by rotating the first housing 231 and the second housing 233 based on the hinge unit 235. Hereinafter, the first display 240 is, but not limited to, folded or unfolded. For example, the first display 240 may be implemented to bend, and examples of the first display 240 which is bent may be described identically or similarly to examples of the first display 240 which is folded or unfolded.

If the first housing 231 and the second housing 233 are folded at a certain angle based on the hinge unit 235, a first portion (e.g., a 1-1 display) of the first display 240 and a second portion (e.g., a 1-2 display) of the first display 240 may also be folded at the certain angle based on the hinge unit 235. For example, in the front view 210, the 1-1 display 240-1 may be a left portion of the first display 240 based on an axis (a dotted line in the front view 210) of the hinge unit 235 and the 1-2 display 240-3 may be a right portion of the first display 240 based on the axis of the hinge unit 235. Hereinafter, the angle between the first housing 213 and the second housing 233 (or the 1-1 display 240-1 and the 1-2 display 240-3) based on the hinge unit 235 is referred to as a folding angle. The folding angle may be formed between the first housing 231 and the second housing 233.

The second display 250 may be exposed to the outside through a third area of the first housing 231. For example, the second display 250 may be disposed on the third area of the first housing 231 which faces away from the first area of the first housing 231. The second display 250 may be disposed on the back of one surface of the first housing 231 including the 1-1 display 240-1. The second display 250 may be a non-foldable display.

The electronic device 101 may further include a third display 260. The third display 260 may be exposed to the outside through a fourth area of the second housing 233. For example, the third display 260 may be disposed on the fourth area of the second housing 233 which faces away from the second area of the second housing 233. The third display 260 may be disposed on the back of one surface of the second housing 23 including the 1-2 display 240-3. The third display 260 may be a non-foldable display.

If the electronic device 101 further includes the third display 260, the second display 250 and the third display 260 may be integrated. If the second display 250 and the third display 260 are integrated, the second display 250 and the third display 260 may rotate (or fold) based on the hinge unit 235.

Figure 3:
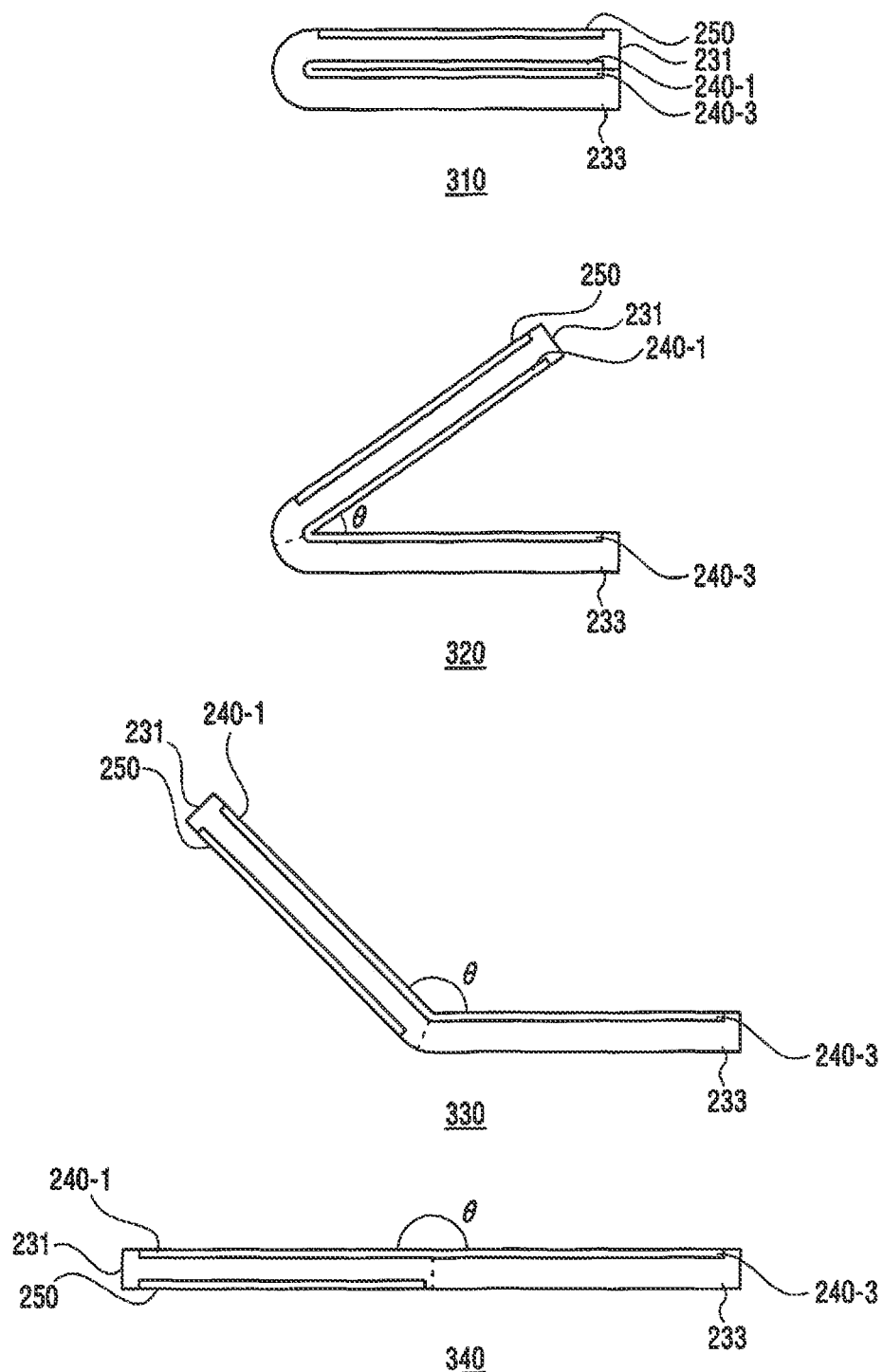
FIG. 3 is an illustration of an electronic device based on a folding angle while the electronic device changes from a folding state to an unfolding state according to an embodiment.

FIG. 3 is an illustration of an electronic device 101 based on a folding angle while the electronic device 101 changes from a folding state to an unfolding state according to an embodiment.

Referring to FIG. 3, the panel 310 shows the electronic device 101 is fully folded. For example, in the panel 310, the electronic device 101 may be at a folding angle θ of about 00. If the electronic device 101 is fully folded, the first display 240 may enter an inactive state (e.g., a standby state or a power-saving state) which displays no content. If the electronic device 101 is fully folded, the second display 250 may display a designated content (e.g., a time) or enter the inactive state.

The panel 320 shows that the electronic device 101 is folded at a folding angle (or an acute angle) below 90° or so. For example, the panel 320 shows that the folding angle θ of the electronic device 101 is about 45°. If the folding angle θ of the electronic device 101 exceeds a first angle, the first display 240 may switch from the inactive state to an active state for displaying content.

The panel 330 shows that the electronic device 101 is folded at a folding angle θ over 90° or so. For example, the panel 330 shows that the folding angle θ of the electronic device 101 is about 135°. If the folding angle θ of the electronic device 101 exceeds a second angle which is greater than the first angle, the second display 250 may switch, but is not limited to, from the active state to the inactive state. The second display 250 may maintain the active state even if the folding angle θ of the electronic device 101 exceeds the second angle.

The panel 340 shows that the electronic device 101 is fully unfolded. For example, in the panel 340, the folding angle θ of the electronic device 101 is about 180°.

While the electronic device 101 changes from the fully folded state to the fully unfolded state in FIG. 3, an example in which the electronic device 101 changes from the fully unfolded state to the fully folded state may be applied in the identical or similar manner.

Hereafter, the operation for changing the electronic device 101 from the fully folded state to the fully unfolded state is referred to as an unfolding operation, and the operation for changing the electronic device 101 from the fully unfolded state to the fully folded state is referred to as a folding operation.

In an embodiment, when the electronic device 101 is fully folded, the 1-1 display 240-1 and the 1-2 display 240-3 face each other in FIG. 2 and FIG. 3. When the electronic device 101 is fully unfolded, the 1-1 display 240-1 and the 1-2 display 240-3 face away from each other. This is described below in greater detail with reference to FIG. 21.

The electronic device 101 is folded based on, but is not limited to, the single hinge unit 235. An example in which the electronic device 101 is folded based on a plurality of hinge units 235 is described below in greater detail with reference to FIG. 21 through FIG. 25.

The electronic device 101 which is fully folded based on the single hinge unit 235 is described below in greater detail with reference to FIG. 4 through FIG. 20.

Figure 4:
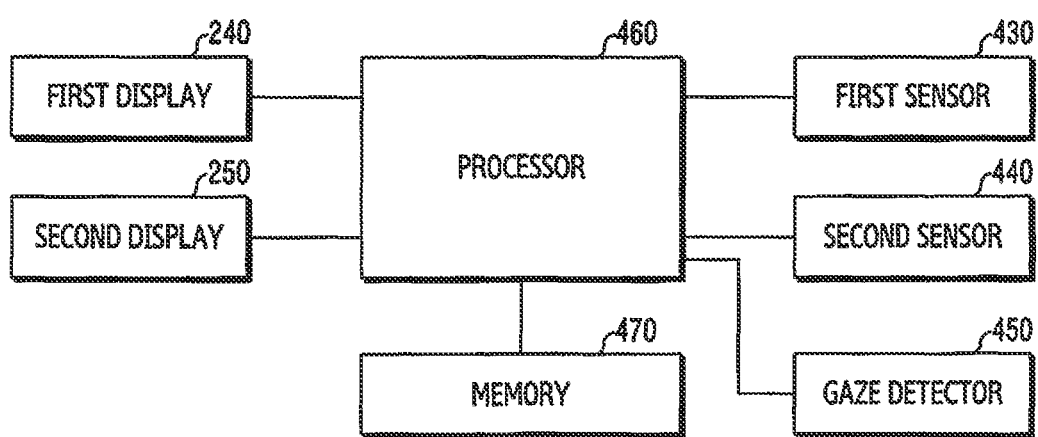
FIG. 4 illustrates a block diagram of an electronic device for providing an image using a foldable display according to an embodiment.

FIG. 4 is a block diagram of an electronic device 101 for providing an image using a foldable display according to an embodiment.

Referring to FIG. 4, the electronic device 101 may include a first display 240, a second display 250, a first sensor 430, a second sensor 440, a gaze detector 450, a processor 460, and a memory 470.

The first display 240 and the second display 250 are identical or similar to the first display 240 and the second display 250 of FIG. 2 in at least part, and accordingly their redundant descriptions are omitted.

The first display 240 and the second display 250 may include touch screens combined with touch panels.

The first display 240 and the second display 250 may be identical or similar to in at least part the display device 160 of FIG. 1.

The first sensor 430 may detect a folding angle.

The first sensor 430 may include a Hall effect sensor. For example, the first housing 231 (or the second housing 233) may include a Hall effect sensor, and the second housing 233 (or the first housing 231) may include a magnet (or a magnetic body). During the folding operation or the unfolding operation, the first sensor 430 implemented with the Hall effect sensor may detect the folding angle by detecting electrical characteristics (e.g., voltage) produced (or changed) by the magnet.

The first sensor 430 for detecting the folding angle is not limited to the Hall effect sensor. For example, the first sensor 430 may be implemented with a load cell, an infrared sensor, a pressure sensor, or an electromagnetic sensor.

The second sensor 440 may detect a status (or posture) of the electronic device 101. For example, the second sensor 440 may detect an angle of the electronic device 101 with respect to the face of the Earth (or relative to the face of the Earth). For example, the second sensor 440 may detect a motion of the electronic device 101.

The second sensor 440 may include, but is not limited to, a sensor disposed in the first housing 231 to detect the angle of the first housing 231 in relation to the face of the Earth, and a sensor disposed in the second housing 233 to detect the angle of the second housing 233 in relation to the face of the Earth. The second sensor 440 may be disposed in either the first housing 231 or the second housing 233.

The second sensor 440 may include at least one of an accelerometer sensor, a gyro sensor, or a geomagnetic sensor, for detecting the status of the electronic device 101.

The first sensor 430 and the second sensor 440 may be identical or similar in at least part to the sensor module 176 of FIG. 1.

The gaze detector 450 may detect a user's gaze direction or viewing direction (e.g., a gaze direction) for the electronic device 101. The gaze detector 450 may detect the gaze direction by detecting a direction of a user's face. The gaze detector 450 may include a camera (e.g., an infrared camera) or a proximity camera.

The processor 460 may control to provide an image using the foldable display.

The processor 460 may control to display an image corresponding to a folding angle in a folding operation or an unfolding operation, which is described below in greater detail with reference to FIG. 5 through FIG. 15.

The processor 460 may control to display an image corresponding to a folding angle and the status of the electronic device 101 (e.g., an angle of the electronic device 101 in relation to the face of the Earth) in a folding operation or an unfolding operation, which is described below in greater detail with reference to FIG. 16 and FIG. 17.

The processor 460 may control to display an image corresponding to a folding angle and a gaze direction in a folding operation or an unfolding operation, which is described below in greater detail with reference to FIG. 18.

Based on a user input, the processor 460 may control to acquire (or generate) an image to be displayed on at least one of the first display 240 or the second display 250 in a folding operation or an unfolding operation, which is described below in greater detail with reference to FIG. 19 and FIG. 20.

The processor 460 may be identical or similar in at least part to the processor 120 of FIG. 1.

The memory 470 may store various information for providing the image using the foldable display.

The memory 470 may store a plurality of images corresponding to folding angles respectively. For example, the memory 470 may store images (or image frames) to be displayed on at least one of the first display 240 or the second display 250 in sequence (or in succession) according to an increase (or a decrease) of a folding angle. The memory 470 may include a table which maps the images to the folding angles respectively.

The memory 470 may store a plurality of images corresponding to the folding angles and the statuses (e.g., the angles of the electronic device 101 in relation to the face of the Earth).

The memory 470 may store a plurality of images corresponding to the folding angles and the gaze directions respectively.

The various information in the memory 470 is described below in greater detail.

The electronic device 101 may further include a component. For example, the electronic device 101 may further include the first housing 231, the second housing 233, and the hinge unit 235 of FIG. 2 or FIG. 3. For example, the electronic device 101 may further include the third display 260 of FIG. 2. For example, the electronic device 101 may further include at least one of the components (e.g., the communication module 160) of FIG. 1.

The electronic device 101 may not include some of the components of FIG. 4. For example, the electronic device 101 may not include at least one of the second sensor 440 or the gaze detector 450.

An electronic device according to various embodiments of the present disclosure may include a housing which includes a first housing and a second housing, a hinge unit for rotating the first housing and the second housing, a first display exposed to outside through a first area of the first housing and a second area of the second housing, a second display exposed to the outside through a third area, which faces away from the first area, of the first housing, a first sensor for detecting a folding angle formed between the first housing and the second housing, a memory for storing a plurality of first images corresponding to a plurality of folding angles respectively, and at least one processor, wherein the at least one processor may be configured to acquire information of the folding angle, through the first sensor, identify an image corresponding to the folding angle among the plurality of the first images, identify at least one display for displaying the image among the first display and the second display, based on the folding angle, and display the image on the at least one display.

The first images may include a plurality of images which dynamically change based on the folding angle.

The first images may include a plurality of images including at least one object which dynamically changes based on the folding angle or a visual effect.

The at least one processor may be configured to, if the folding angle ranges from a first angle to a second angle, identify the second display as the display for displaying the image, and if the folding angle ranges from the second angle to a third angle, identify the first display as the display for displaying the image.

The at least one processor may be configured to, if the folding angle ranges from a fourth angle to a fifth angle, identify the second display as the at least one display for displaying the image, if the folding angle ranges from the fifth angle to a sixth angle, identify the first display and the second display as the at least one display for displaying the image, and if the folding angle ranges from the sixth angle to a seventh angle, identify the first display as the at least one display for displaying the image.

The electronic device may further include a second sensor for detecting an angle of the electronic device in relation to a face of the Earth, wherein the memory may be configured to store a plurality of second images corresponding to the folding angles and angles of the electronic device in relation to the face of the Earth, and the at least one processor may be configured to acquire angle information of the electronic device in relation to the face of the Earth, from the second sensor, identify an image corresponding to the folding angle and the angle of the electronic device, among the second images, and display the image corresponding to the folding angle and the angle of the electronic device, on the at least one display.

The electronic device may further include a gaze detector for detecting a gaze direction of a user, wherein the memory may be configured to store a plurality of third images corresponding to the folding angles and gaze directions, and the at least one processor may be configured to acquire gaze direction information from the gaze detector, identify an image corresponding to the folding angle and the gaze direction, among third images, and display the image corresponding to the folding angle and the gaze direction, on the at least one display.

The at least one processor may be configured to generate the first images, based on a user input.

The at least one processor may be configured to acquire an original image, display the original image on the first display or the second display, and generate the first images, based on a user input for the original image.

Figure 5:
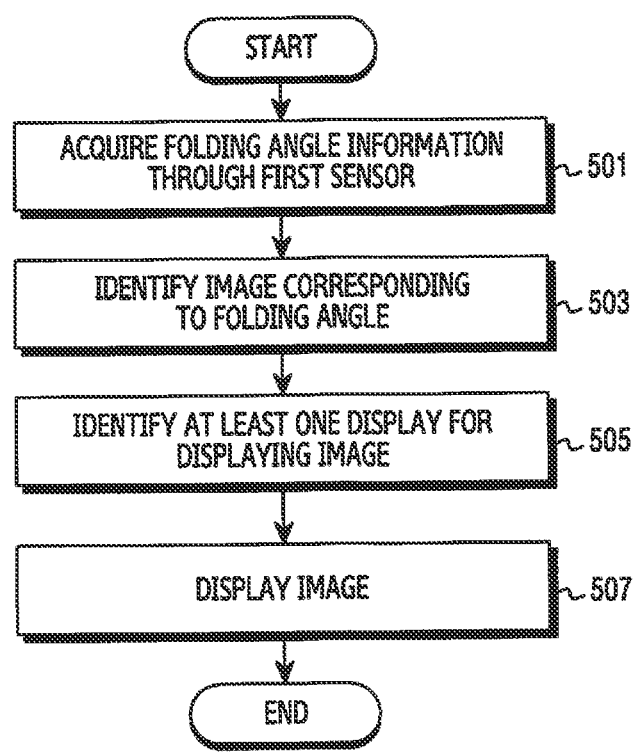
FIG. 5 illustrates a flowchart of a method for providing an image using a foldable display according to an embodiment.

FIG. 5 illustrates a flowchart of a method for providing an image using a foldable display according to an embodiment.

Referring to FIG. 5, in step 501, the processor 460 may acquire folding angle information through the first sensor 430.

The processor 460 may acquire from the first sensor 430, the folding angle information which is detected by the first sensor 430 and formed between the first housing 231 and the second housing 233 based on the hinge unit 235.

In ta folding operation or an unfolding operation, the processor 460 may acquire the folding angle information through the first sensor 430. The first sensor 430 may include a Hall effect sensor, a load cell, an infrared sensor, a pressure sensor, or an electromagnetic sensor, for detecting the folding angle. The first sensor 430 may provide the detected folding angle information to the processor 460.

In step 503, the processor 460 may identify an image corresponding to the folding angle.

The processor 460 may identify the image corresponding to the folding angle among a plurality of images (or image frames) stored in the memory 470 and corresponding to the folding angles respectively.

The images corresponding to the folding angles may be displayed in sequence (or in succession) according to the folding angle, in the folding operation or the unfolding operation. Hereafter, the images corresponding to the folding angles are referred to as a plurality of designated images.

The designated images may be created by a designer of the electronic device 101 or a third party service provider. The designated images may be generated based on a user input, which is described below in greater detail with reference to FIG. 19 and FIG. 20.

The designated images may include images which dynamically change as the folding angle changes.

The designated images may each include at least one object, and a visual representation of the at least one object may dynamically change while the folding angle increases or decreases in the folding operation or the unfolding operation. For example, the designated images may be displayed to move at least one object therein sequentially (or successively) while the folding angle increases or decreases in the folding operation or the unfolding operation.

The designated images may include a visual effect which dynamically changes while the folding angle increases or decreases in the folding operation or the unfolding operation.

The designated images are not limited thereto, and various examples of the designated images are described below in greater detail.

In step 505, the processor 460 may identify at least one display for displaying the image, based on the folding angle. The processor 460 may identify at least one display for displaying the image identified to correspond to the folding angle, based on the folding angle.

While the electronic device 101 fully folded (e.g., at the folding angle of 0°) is unfolded to a first angle, the processor 460 may identify that the second display 250 is to display some of the designated images (some of the designated image frames). For example, if N-ary images are to be displayed while the folding angle changes from 0° to 180°, the processor 460 may identify that the second display 250 is to display M-ary designated images, wherein M is less than N, at the folding angle ranging from 0° to the first angle. While the folding angle increases from the first angle to the second angle (e.g., 180°) which is greater than the first angle, the processor 460 may identify that the first display 240 is to display some other of the designated images. For example, if the folding angle ranges from the first angle to the second angle, the processor 460 may identify that the first display 240 is to display (N−M)-ary designated images.

While the electronic device 101 fully folded is unfolded to a third angle, the processor 460 may identify that the second display 250 is to display some of the designated images. If the folding angle ranges from the third angle to a fourth angle, the processor 460 may identify that the first display 240 and the second display 250 are to display some other of the designated images. If the folding angle ranges from the fourth angle to a fifth angle (e.g., 180°), the processor 460 may identify that the first display 240 is to display yet some other of the designated images.

Identifying at least one display for displaying the image may include identifying a portion of at least one display for displaying the image. While the electronic device 101 fully folded is unfolded to a sixth folding angle, the processor 460 may identify that the portion of the display for displaying some of the designated images is the second display 250. If the folding angle ranges from the sixth angle to a seventh angle, the processor 460 may identify that the portion of the display for displaying some other of the designated images is the 1-2 display 240-3 which is part of the first display 240 and the second display 250. If the folding angle ranges from the seventh angle to an eighth angle (e.g., 180°), the processor 460 may identify, that the display for displaying yet some other of the designated images is the first display 240 including both of the 1-1 display 240-1 and the 1-2 display 240-3.

Identifying at least one display for displaying the image may include identifying at least part of at least one display for displaying the image. While the electronic device 101 fully folded is unfolded to a ninth folding angle, the processor 460 may identify that at least part of the display for displaying some of the designated images is the second display 250. If the folding angle ranges from the ninth angle to a tenth angle, the processor 460 may identify that at least part of the display for displaying other some of the designated images is at least part of the 1-2 display 240-3, which increases (or decreases) according to the increase (or the decrease) of the folding angle, and the second display 250. If the folding angle ranges from the tenth angle to an eleventh angle (e.g., 180°), the processor 460 may identify that the display for displaying yet other some of the designated images is the first display 240 including both of the 1-1 display 240-1 and the 1-2 display 240-3.

In step 507, the processor 460 may display the image on at least one display. For example, the processor 460 may display the image corresponding to the folding angle on at least one of the first display 240 or the second display 250.

In the folding operation or the unfolding operation, the processor 460 may sequentially display the designated images according to the folding angle, on at least one display.

If displaying the image on all of the second display 250 and at least part (e.g., at least part of the 1-1 display 240-1 or the 1-2 display 240-3) of the first display 240 based on the folding angle, the processor 460 may display a visual representation as if the user views different parts of one image through the second display 250 and at least part of the first display 240. For example, if the folding angle ranges from the third angle to the fourth angle, the processor 460 may display the image on the 1-2 display 240-3 and the second display 250, to provide a visual sensation as if the user, who views the electronic device 101 in a vertical direction to a front surface (e.g., panel 210) of the electronic device 101, views one continuous image on the 1-2 display 240-3 and the second display 250.

While step 503 of identifying the image corresponding to the folding angle precedes step 505 of identifying the at least one display for displaying the image based on the folding angle, step 505 may precede step 503 or step 503, and step 505 may be performed in parallel (or concurrently) with step 503.

If the electronic device 101 includes the third display 260, the processor 460 may display the image corresponding to the folding angle on at least one of the first display 240, the second display 250, or the third display 260 in the identical or similar manner to FIG. 5. For example, while the second display 250 faces the Earth and the electronic device 101 is unfolded from the fully folded state, the processor 460 may display the image corresponding to the folding angle on at least one of the third display 260 or the first display 240.

In the folding operation or the unfolding operation, the image displayed by the processor 460 on at least one of the third display 260 or the first display 240 may be different from the image displayed by the processor 460 on at least one of the second display 250 or the first display 240. For example, while the electronic device 101 fully folded is unfolded with the third display 260 facing the Earth, the processor 460 may display an image including, but not limited to, an object which gradually increases in size, on at least one of the second display 250 or the first display 240. While the electronic device 101 fully folded is unfolded with the third display 260 facing the Earth, the processor 460 may display an image including, but is not limited to, an object which gradually decreases in size, on at least one of the third display 260 or the first display 240. In the folding operation or the unfolding operation, the image displayed by the processor 460 on at least one of the third display 260 or the first display 240 may be the same as the image displayed by the processor 460 on at least one of the second display 250 or the first display 240.

Figure 6:
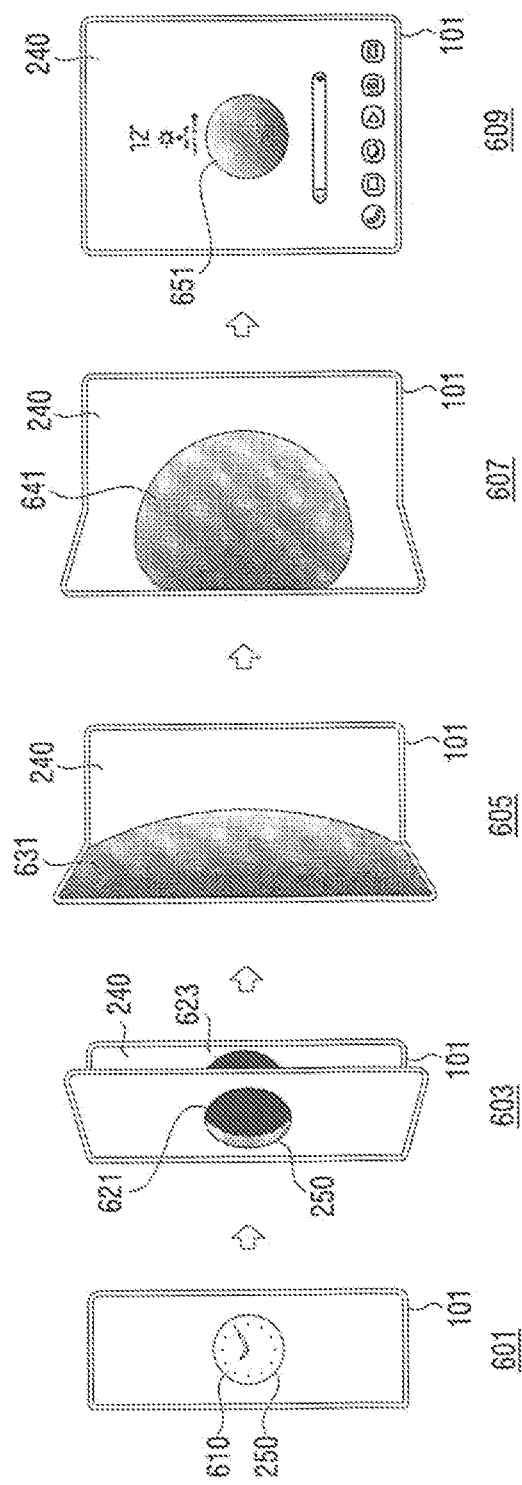
FIG. 6 is an illustration of a method for providing an image including an object using a foldable display according to an embodiment.

FIG. 6 is an illustration of a method for providing an image including an object using a foldable display according to an embodiment.

Referring to FIG. 6, the processor 460 may display an image including an object 610 indicating a watch, on the second display 250 while the electronic device 101 is fully folded as shown in panel 601. The processor 460 may display a basic screen on the second display 250 as shown in panel 601 while the electronic device 101 is fully folded. However, the image displayed in the electronic device 101 fully folded is not limited to the example of panel 601. For example, if the electronic device 101 is fully folded, the processor 460 may display no image on the second display 250. For example, if the electronic device 101 is fully folded, based on a user input, the processor 460 may display an image on the second display 250 as shown in panel 601.

The processor 460 may display screens of panel 603 through panel 609, as the folding angle increases in the unfolding operation.

While the electronic device 101 fully folded is unfolded to the first folding angle, the processor 460 may display an image including an object which dynamically changes, on the second display 250. For example, while the electronic device 101 fully folded is unfolded to the first folding angle, the processor 460 may sequentially (or successively) display images including an object indicating the Moon, which rotatably moves and changes in size, on the second display 250.

At the folding angle ranging from the first angle to the second angle, the processor 460 may display an image including an object which dynamically changes, on the first display 240 and the second display 250. For example, while the folding angle increases from the first angle to the second angle, the processor 460 may display images including an object 621 indicating part of the Moon which rotatably moves and changes in size, on the second display 260 and display images including an object 623 indicating other part of the Moon than the part of the Moon of the object 621, which rotatably moves and changes in size, on the first display 240. As shown in panel 603, the processor 460 may display the object 621 and the object 623 on the first display 240 and the second display 250, as if the user views the object indicating the single (the same) Moon on the first display 240 and the second display 250.

At the folding angle ranging from the second angle to the third angle (180°), the processor 460 may display an image including an object which dynamically changes, on the first display 240. For example, as shown in panels 605 through 609, as the folding angle increases from the second angle to the third angle, the processor 460 may display images including objects 631 through 651 indicating the Moon which rotatably moves and changes in size, on the 1-1 display 240-1 and the 1-2 display 240-3.

The panel 609 may display a screen of the electronic device 101 fully unfolded.

As shown in panels 601 through 609, in the unfolding operation, the processor 460 may display the designated images including the object indicating the Moon which rotatably moves and changes in size, on at least one of the first display 240 or the second display 250.

If the user unfolds the electronic device 101 quickly, the processor 460 may display images including an object which dynamically changes in response to the unfolding (or folding) speed of the electronic device 101, on at least one of the first display 240 or the second display 250.

While the electronic device 101 fully folded is fully unfolded in FIG. 6, the electronic device 101 fully unfolded may be fully folded in the identical or similar manner.

Figure 7:
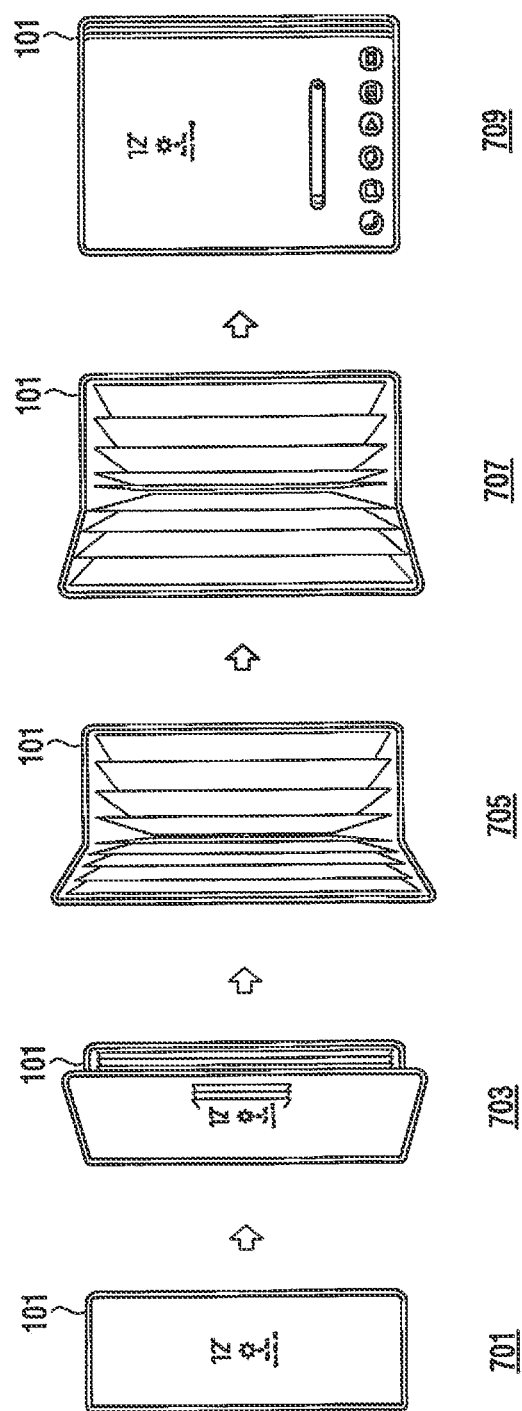
FIG. 7 is an illustration of a method for providing an image including a visual effect using a plurality of surfaces on a foldable display according to an embodiment.
Figure 8:
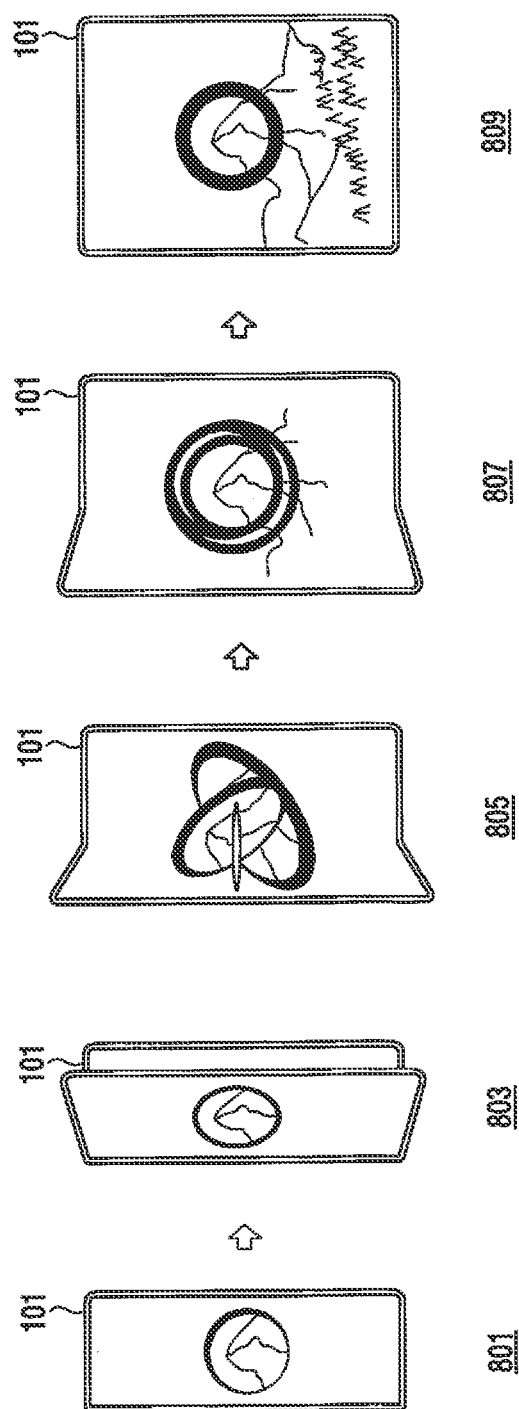
FIG. 8 is an illustration of a method for providing an image including a visual effect using a plurality of surfaces on a foldable display according to an embodiment.

FIG. 7 and FIG. 8 are illustrations of a method for providing an image including a visual effect using a plurality of surfaces on a foldable display according to an embodiment.

Referring to FIG. 7 and FIG. 8, in the folding operation or the unfolding operation, the processor 460 may display images including a visual effect which dynamically changes, using surfaces of various sizes, positions, and angles, on at least one of the first display 240 or the second display 250.

As shown in panels 701 through 709 of FIG. 7, while the electronic device 101 switches from the fully folded state to the fully unfolded state, the processor 460 may display images including a visual effect of spreading the surfaces as if turning over pages of a book, on at least one of the first display 240 or the second display 250.

As shown in panels 801 through 809 of FIG. 8, while the electronic device 101 switches from the fully folded state to the fully unfolded state, the processor 460 may display images including a visual effect of responding in three dimensions by crossing two surfaces, on at least one of the first display 240 or the second display 250.

While the electronic device 101 fully folded is fully unfolded in FIG. 7 and FIG. 8, the electronic device 101 fully unfolded may be fully folded in the identical or similar manner.

In the folding operation or the unfolding operation, the processor 460 may provide a three-dimensional (3D) visual effect by displaying images including the visual effect which dynamically changes, using surfaces of various sizes, positions, and angles, on at least one of the first display 240 or the second display 250.

Figure 9:
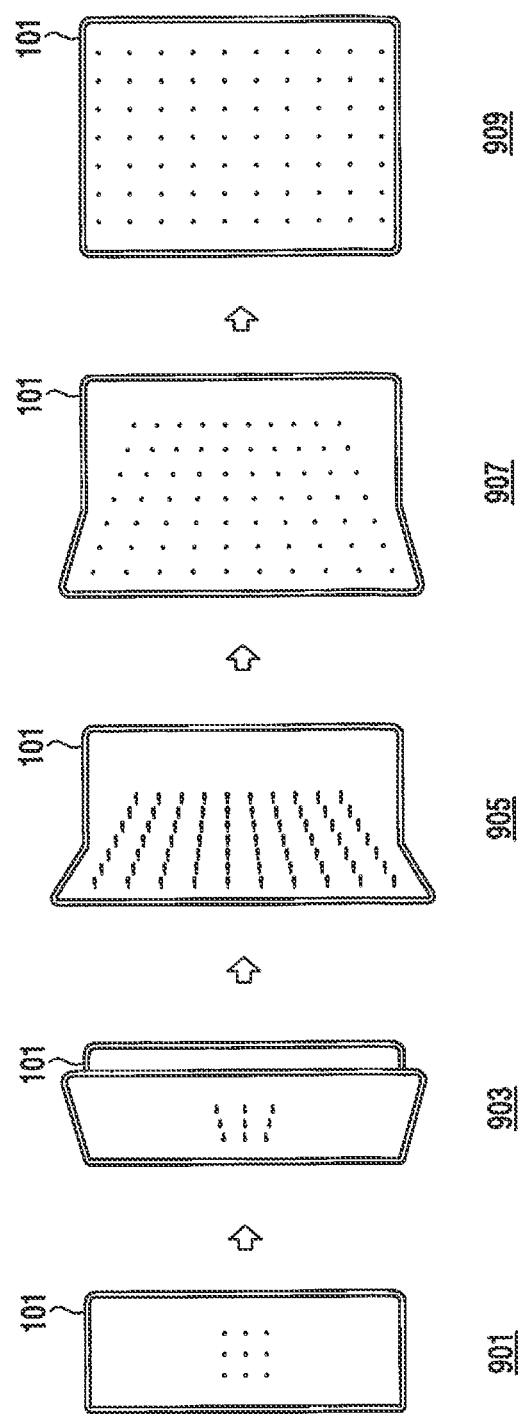
FIG. 9 is an illustration of a method for providing an image including a visual effect using a plurality of lines and points on a foldable display according to an embodiment.
Figure 10:
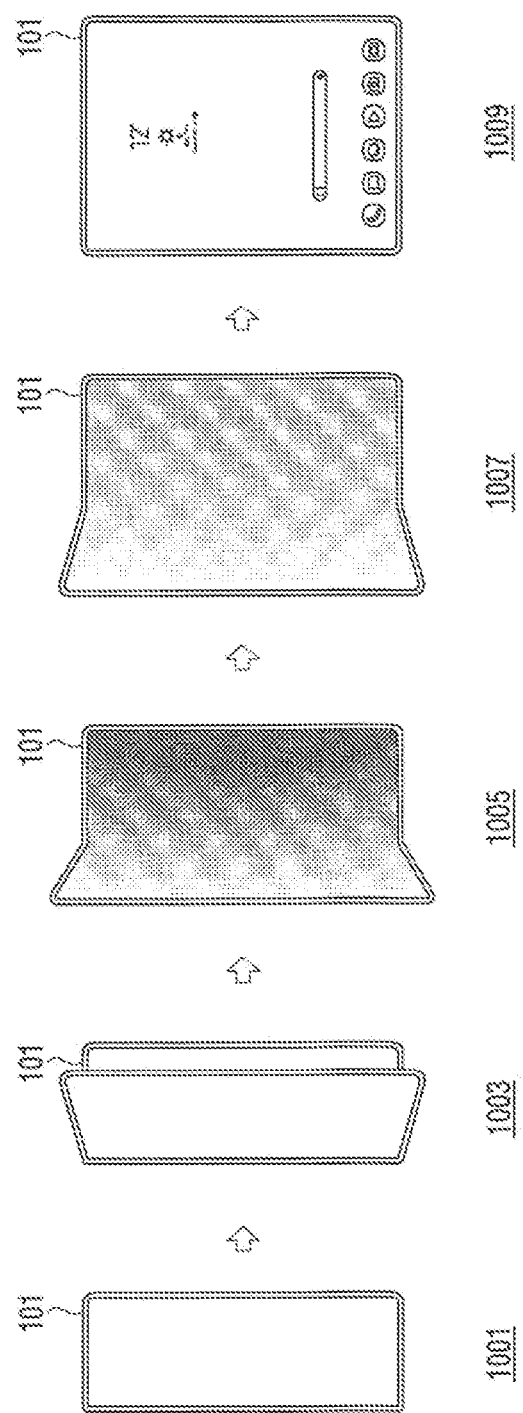
FIG. 10 is an illustration of a method for providing an image including a visual effect using a plurality of lines and points on a foldable display according to an embodiment.
Figure 11:
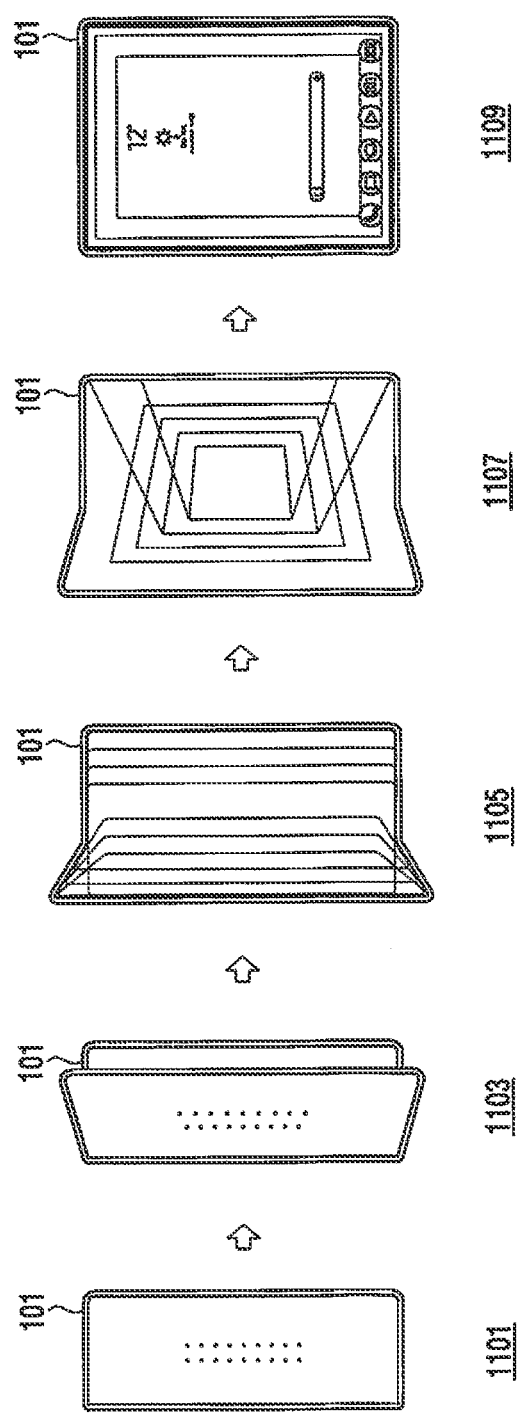
FIG. 11 is an illustration of a method for providing an image including a visual effect using a plurality of lines and points on a foldable display according to an embodiment.

FIGS. 9, 10 and 11 are illustrations of a method for providing an image including a visual effect using a plurality of lines and points on a foldable display according to an embodiment.

Referring to FIGS. 9, 10 and 11, in the folding operation or the unfolding operation, the processor 460 may display images including a visual effect which dynamically changes, using a plurality of lines and points, on at least one of the first display 240 and the second display 250.

As shown in panels 901 through 909 of FIG. 9, while the electronic device 101 switches from the fully folded state to the fully unfolded state, the processor 46i0 may display images including a visual effect of giving depth to objects indicating points sequentially arranged, on at least one of the first display 240 and the second display 250.

As shown in panels 1001 through 1009 of FIG. 10, while the electronic device 101 switches from the fully folded state to the fully unfolded state, the processor 460 may display images including a visual effect of changing color of objects indicating points sequentially arranged, on at least one of the first display 240 and the second display 250.

As shown in panels 1101 through 1109 of FIG. 11, while the electronic device 101 switches from the fully folded state to the fully unfolded state, the processor 46i0 may display images including a visual effect of seamlessly connecting at least part of lines or points, on at least one of the first display 240 and the second display 250.

While the electronic device 101 switches from the fully folded state to the fully unfolded state in FIGS. 9, 10 and 11, the electronic device 101 fully unfolded may be fully folded in the identical or similar manner.

In the folding operation or the unfolding operation, the processor 460 may provide a 3D space to the user by displaying images including a 3D visual effect using a plurality of lines and points changing dynamically, on at least one of the first display 240 and the second display 250.

Figure 12:
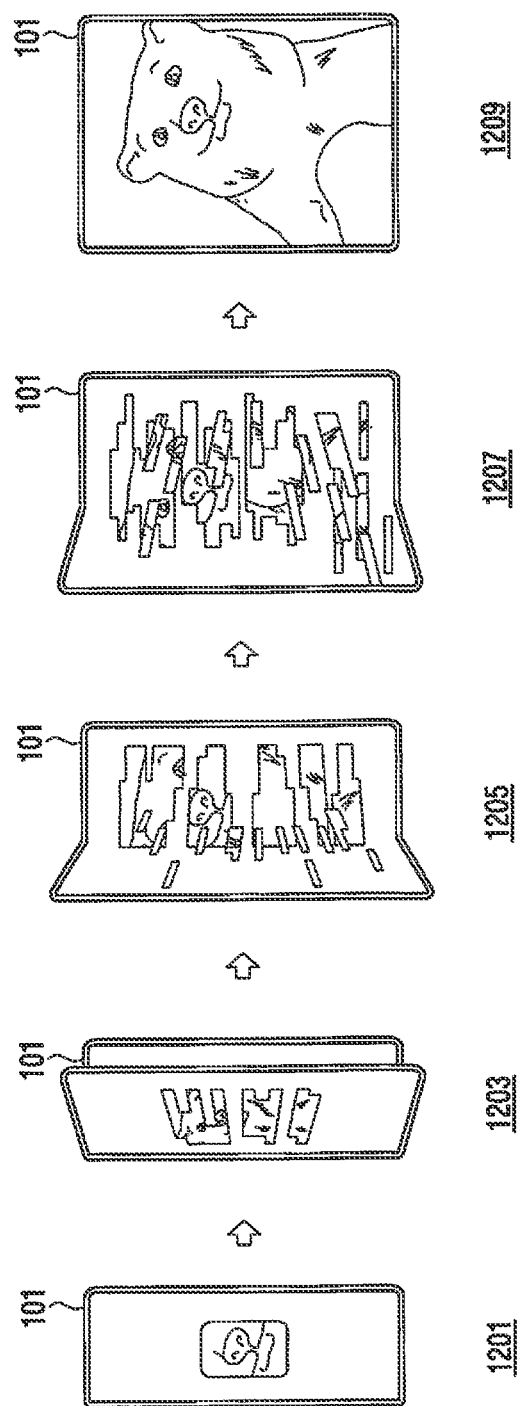
FIG. 12 is an illustration of a method for providing an image based on a single original image using a foldable display according to an embodiment.
Figure 13:
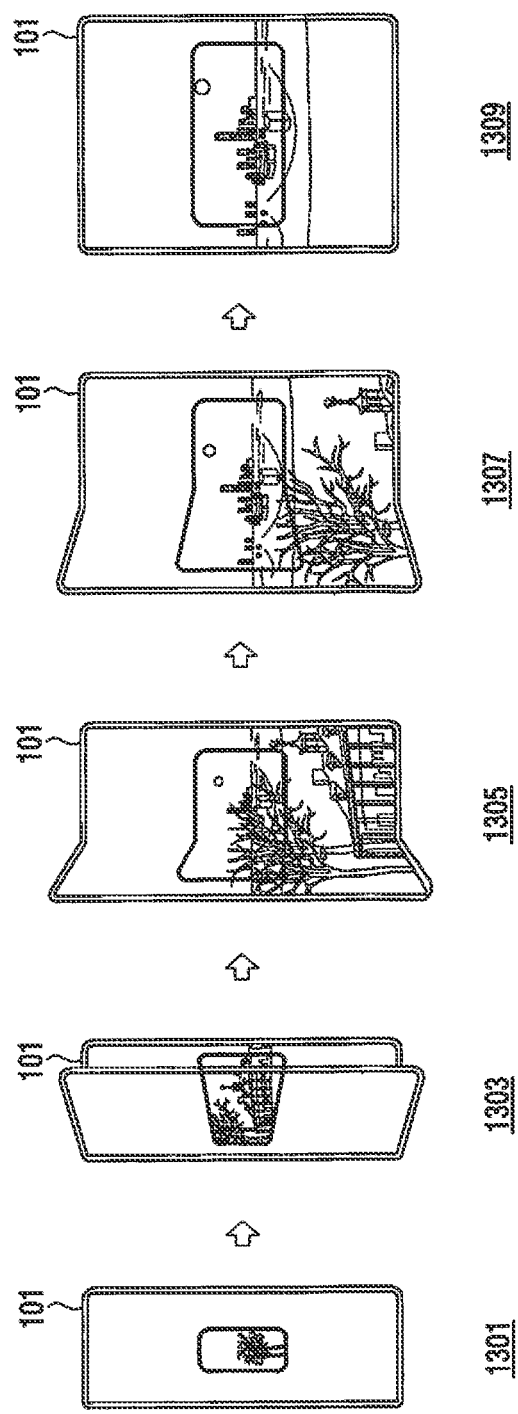
FIG. 13 is an illustration of a method for providing an image based on a single original image using a foldable display according to an embodiment.
Figure 14:
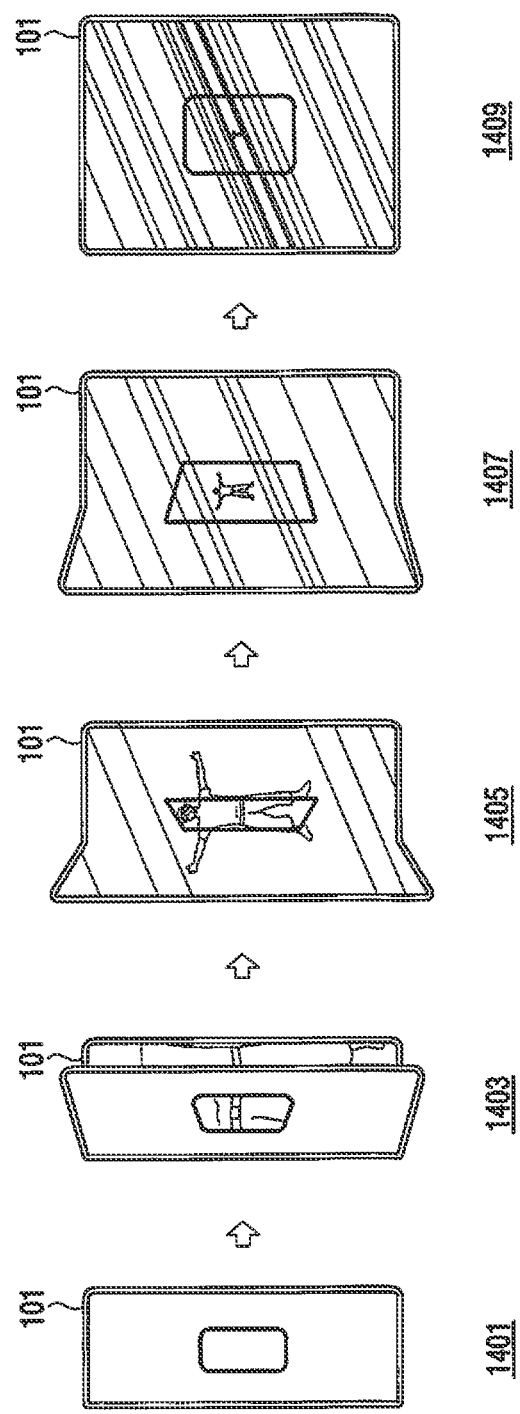
FIG. 14 is an illustration of a method for providing an image based on a single original image using a foldable display according to an embodiment.

FIGS. 12, 13, and 14 are illustrations of a method for providing an image based on a single original image using a foldable display according to an embodiment.

Referring to FIGS. 12, 13, and 14, the processor 460 may generate a plurality of designated images based on one image. For example, the processor 460 may receive from the user an input for acquiring (or selecting) an image (e.g., an original image) for creating the designated images. Based on the original image, the processor 460 may generate the designated images which dynamically change.

As shown in panels 1201 through 1209 of FIG. 12, while the electronic device 101 switches from the fully folded state to the fully unfolded state, the processor 460 may display the designated images generated based on the original image to expand from part of the original image to the whole original image, on at least one of the first display 240 and the second display 250. The original image may be the image in panel 1209 of FIG. 12. In the unfolding operation, the processor 460 may display the designated images including the visual effect of panels 1203 through 1207, on at least one of the first display 240 or the second display 250

As shown in panels 1301 through 1309 of FIG. 13, while the electronic device 101 switches from the fully folded state to the fully unfolded state, the processor 460 may display the designated images generated based on the original image by panning, zooming in, expanding, and zooming out part of the original image, on at least one of the first display 240 or the second display 250. For example, while the electronic device 101 switches from the fully folded state to the fully unfolded state, the processor 460 may display the designated images generated based on a panorama image by panning, expanding, and zooming out part of the panorama image, on at least one of the first display 240 or the second display 250. The original image may be the image in panel 1309 of FIG. 13.

As shown in panels 1401 through 1409 of FIG. 14, while the electronic device 101 switches from the fully folded state to the fully unfolded state, the processor 460 may display the designated images generated based on the original image by zooming out the original image, on at least one of the first display 240 or the second display 250.

While the electronic device 101 switches from the fully folded state to the fully unfolded state in FIGS. 12, 13 and 14, the electronic device 101 fully unfolded may be fully folded in the identical or similar manner.

Figure 15:
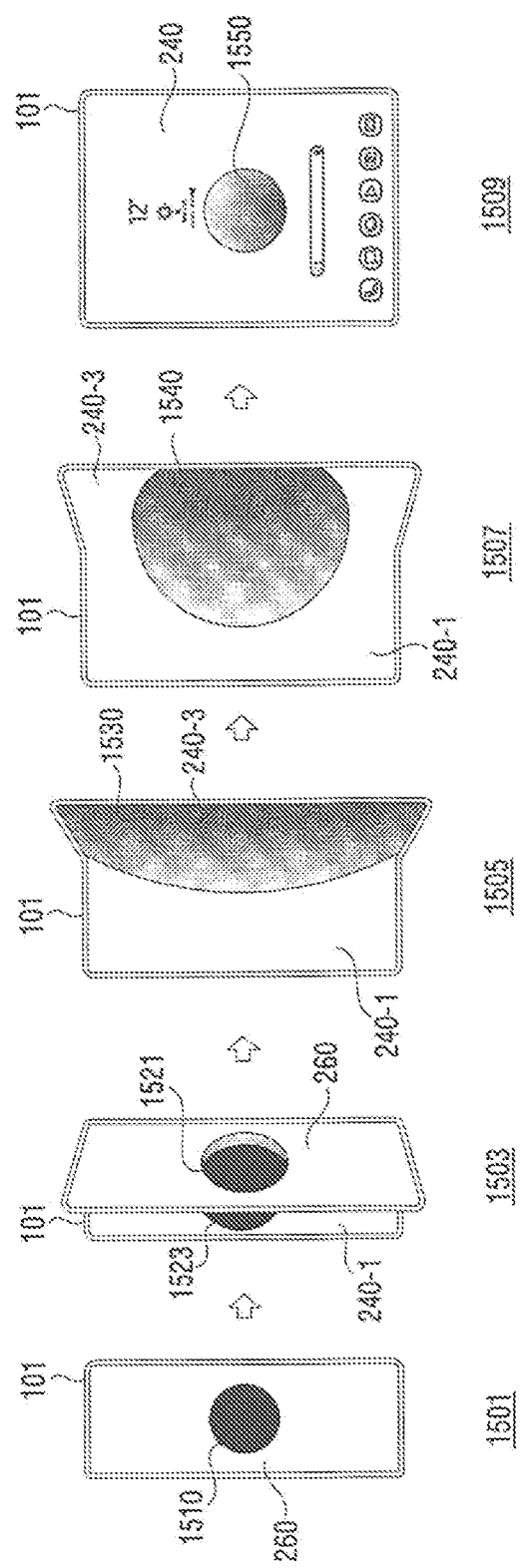
FIG. 15 is an illustration of a method for providing an image including an object using a foldable display according to an embodiment.

FIG. 15 is an illustration of a method for providing an image including an object using a foldable display according to an embodiment. For example, FIG. 15 illustrates images displayed if the electronic device 101 further includes the third display 360 that is folded or unfolded.

Referring to FIG. 15, the processor 460 may display an image including an object 1510 indicating the Moon on the third display 260 in the electronic device 101 fully folded, as shown in panel 1501. However, the image displayed on the third display 260 in the electronic device 101 fully folded is not limited to the example of panel 1501.

As the folding angle increases according to the unfolding operation, the processor 460 may display screens of panels 1503 through 1509 on at least one of the third display 260 or the first display 240.

While the electronic device 101 fully folded is unfolded to the first angle, the processor 460 may display an image including an object dynamically changing, on the third display 260. For example, while the electronic device 101 fully folded is unfolded to the first angle, the processor 460 may sequentially (or successively) display images including the object indicating the Moon which rotatably moves and changes in size, on the third display 260.

At the folding angle ranging from the first angle to the second angle, the processor 460 may display an image including an object which dynamically changes, on the first display 240 and the third display 260. For example, while the folding angle increases from the first angle to the second angle, the processor 460 may display images including an object 1521 indicating part of the Moon which rotatably moves and changes in size on the third display 260 and display an object 1523 indicating other part of the Moon than the part of the Moon indicated by the object 1521, which rotatably moves and changes size, on the first display 260. As shown in panel 1503, the processor 460 may display the object 1521 and the object 1523 on the first display 240 and the third display 260, as if the user views the object indicating the single (the same) Moon on the first display 240 and the third display 260.

At the folding angle ranging from the second angle to the third angle (180°), the processor 460 may display an image including an object which dynamically changes, on the first display 240. For example, as shown in panel 1505 through 1509, as the folding angle increases from the second angle to the third angle, the processor 460 may display images 1530 through 1550 indicating the Moon which rotatably moves and changes in size, on the 1-1 display 240-1 and the 1-2 display 240-3.

The screen in the diagram 1509 is displayed in the electronic device 101 fully unfolded.

While the electronic device 101 switches from the fully folded state to the fully unfolded state in FIG. 15, the electronic device 101 fully unfolded may be fully folded in the identical or similar manner.

As shown in FIG. 15, in the folding operation or the unfolding operation, the method of the processor 460 for displaying the image dynamically changing on at least one of the third display 260 or the first display 240 may be similar to, but is not limited to, the method of the processor 460 for displaying the image dynamically changing on at least one of the second display 250 or the first display 240 of FIG. 6.

For example, in the folding operation or the unfolding operation, the method of the processor 460 for displaying the image dynamically changing on at least one of the third display 260 or the first display 240 may be different from the method of the processor 460 for displaying the image dynamically changing on at least one of the second display 250 or the first display 240. For example, while the third display 260 faces the Earth and the electronic device 101 fully folded is unfolded, the processor 460 may display an image including an object which gradually increases in size, on at least one of the second display 250 or the first display 240. While the second display 260 faces the Earth and the electronic device 101 fully folded is unfolded, the processor 460 may display an image including an object which gradually decreases in size, on at least one of the third display 260 or the first display 240.

Figure 16:
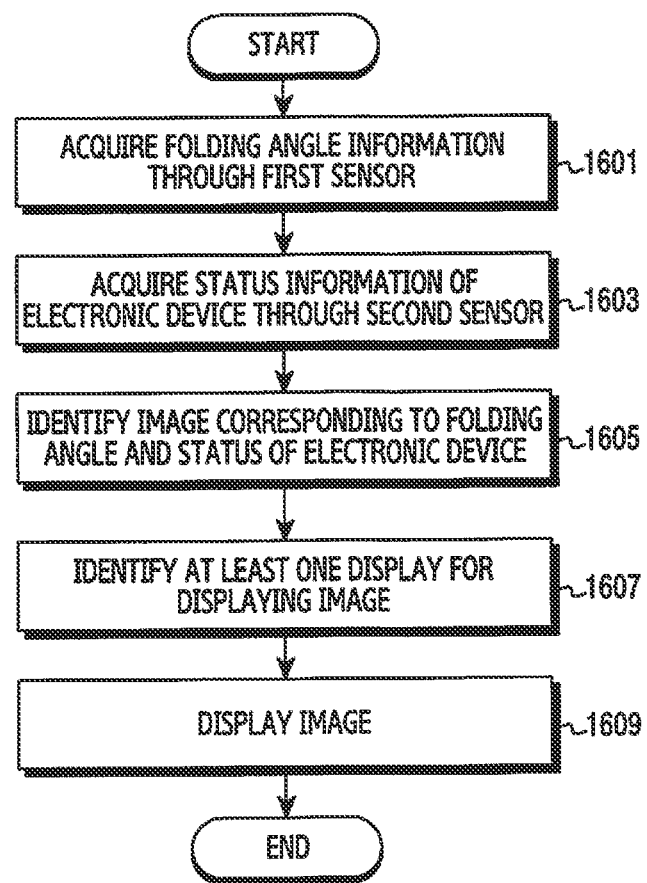
FIG. 16 illustrates a flowchart of a method for providing an image using a foldable display by considering a status of an electronic device according to an embodiment.

FIG. 16 is a flowchart of a method for providing an image using a foldable display by further considering a status of an electronic device 101 according to an embodiment.

Referring to FIG. 16, in step 1601, the processor 460 may acquire folding angle information through the first sensor 430.

Step 1601 is identical or similar at least in part to step 501 of FIG. 5 and, accordingly, its further detailed descriptions are omitted.

In step 1603, the processor 460 may acquire status (or posture) information of the electronic device 101 through the second sensor 440.

The processor 460 may acquire angle information of the electronic device 101 in relation to facing the Earth from the second sensor 440. For example, the processor 460 may acquire the angle information of the electronic device 101 in relation to facing the Earth, which is detected by the second sensor 440 disposed in at least one of the first housing 231 or the second housing 233.

In step 1605, the processor 460 may identify an image corresponding to the folding angle and the status of the electronic device 101.

The processor 460 may identify the image corresponding to the folding angle and the current status of the electronic device 101 among a plurality of designated images stored in the memory 470 and corresponding to the folding angles and the statuses of the electronic device 101.

The designated images may be displayed in sequence (or in succession) according to the folding angle and the status of the electronic device 101, in the folding operation or the unfolding operation.

The designated images may be created by the designer of the electronic device 101 or the third party service provider. The designated images may be generated based on a user input.

The designated images may include images which dynamically change according to the change of the folding angle and the status of the electronic device 101.

The designated images may each include at least one object, and a visual representation of the at least one object may dynamically change while the folding angle increases or decreases and the status (e.g., the angle of the electronic device 101 in relation to facing the Earth) of the electronic device 101 changes in the folding operation or the unfolding operation.

The designated images may include a visual effect which dynamically changes while the folding angle increases or decreases and the status of the electronic device 101 changes in the folding operation or the unfolding operation.

In step 1607, the processor 460 may identify at least one display for displaying the image, based on at least one of the folding angle or the status of the electronic device 101.

Step 1607 is identical or similar at least in part to step 505 of FIG. 5 and, accordingly, its further detailed descriptions are omitted.

The processor 460 may identify at least one display for displaying the image based on the status of the electronic device 101.

For example, if the second housing 233 is parallel while facing the Earth (e.g., the direction of the front surface of the second housing 233 is parallel while facing the Earth), the processor 460 may identify that the display for displaying the image at the first folding angle is the second display 250 and the first display 240. If the second housing 233 is tilted such that a left portion (e.g., the farthest portion from the hinge unit 235 in the second housing 233) of the second housing 233 is closer to the Earth while facing the Earth than a right portion (e.g., the closest portion to the hinge unit 235 in the second housing 233), the processor 460 may identify that the display for displaying the image at the second folding angle which is greater than the first folding angle is the second display 250 and the first display 240. If the second housing 233 is tilted such that its left portion is closer to the Earth while facing the Earth than the right portion, the processor 460 may identify that the display for displaying the image at the third folding angle which is less than the first folding angle is the second display 250 and the first display 240.

For example, if the second housing 233 is parallel with the Earth while facing the Earth, the processor 460 may identify that the display for displaying the image at the fourth folding angle is the first display (e.g., if the second display 250 switches from the active state to the inactive state). If the second housing 233 is tilted such that its right portion is closer to the Earth while facing the Earth than the left portion, the processor 460 may identify that the display for displaying the image at the fifth folding angle which is greater than the fourth folding angle is the first display 240. If the second housing 233 is tilted such that its left portion is closer to the Earth while facing the Earth than the right portion, the processor 460 may identify that the display for displaying the image at the sixth folding angle which is less than the fourth folding angle is the first display 240.

In step 1609, in an embodiment, the processor 460 may display the image on at least one display. For example, the processor 460 may display the image corresponding to the folding angle and the status of the electronic device 101 on at least one of the first display 240 or the second display 250.

Step 1609 is identical or similar at least in part to step 507 of FIG. 5 and, accordingly, its further detailed descriptions are omitted.

Figure 17:
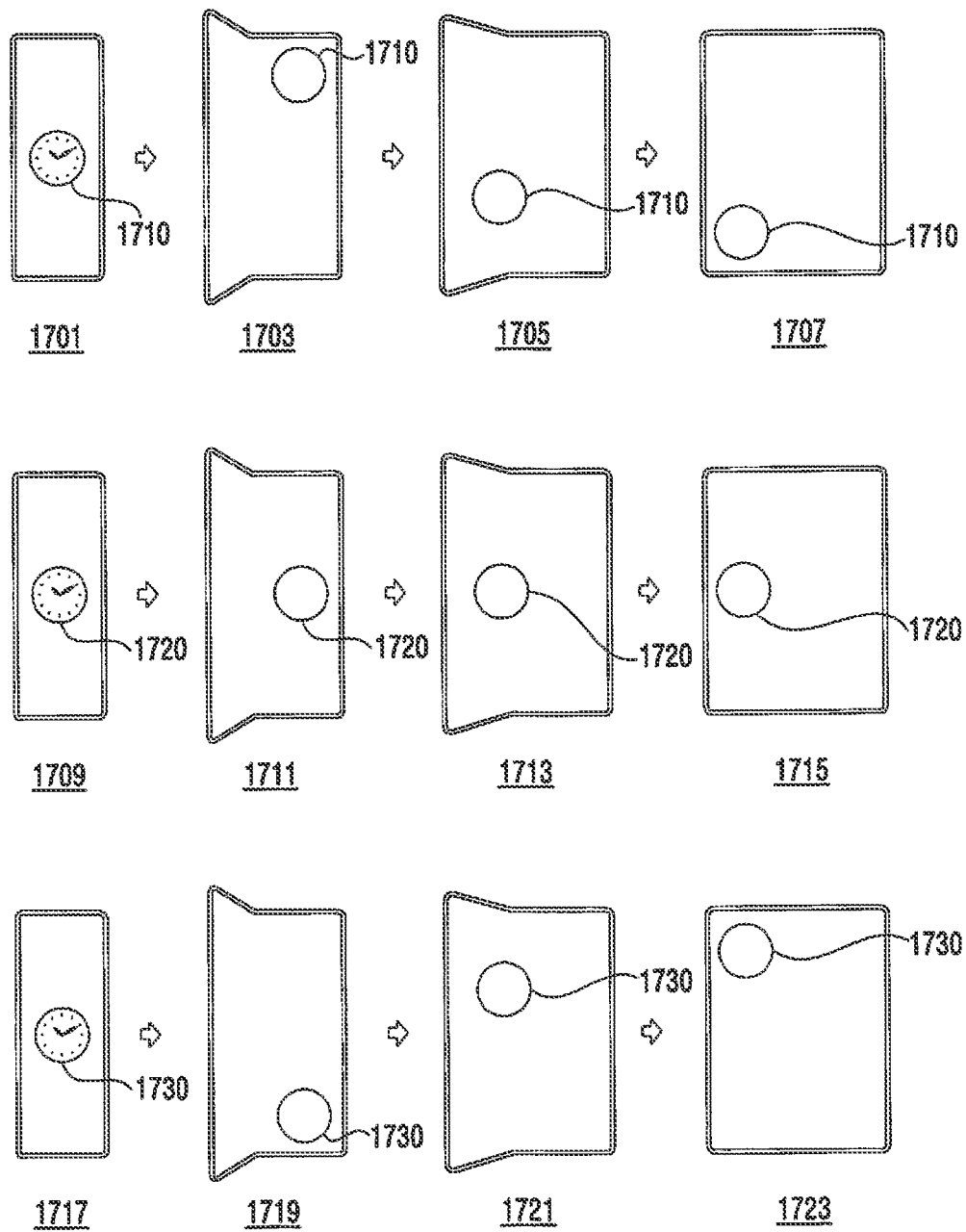
FIG. 17 is an illustration of a method for providing an image using a foldable display by considering a status of an electronic device according to an embodiment.

FIG. 17 is an illustration of a method for providing an image using a foldable display by considering a status of an electronic device 101 according to an embodiment.

Referring to FIG. 17, in panels 1701 through 1707, the second housing 233 is tilted such that a lower portion of the second housing 233 is closer to the Earth while facing the Earth than an upper portion.

With the electronic device 101 fully folded, the processor 460 may display an image including a first object 1701 at the center of the second display 250 as shown in panel 1701.

If the electronic device 101 fully folded is unfolded to the first angle which is less than the folding angle of panel 1703, the processor 460 may display images which move the first object 1701 from the center of the second display 250 to an upper right portion of the second display 250, on the second display 250.

As shown in panels 1701 through 1707, if the electronic device 101 is fully unfolded from the folding angle of panel 1703, the processor 460 may display images which move the first object 1701 from the upper right portion of the first display 240 to a lower left portion of the first display 240, on the first display 240.

In panels 1709 through 1715, the second housing 233 is parallel with the Earth while facing the Earth.

With the electronic device 101 fully folded, the processor 460 may display an image including a second object 1720 at the center of the second display 250 as shown in panel 1709.

If the electronic device 101 fully folded is unfolded to the second angle which is less than the folding angle of panel 1711, the processor 460 may display images which move the second object 1720 from the center of the second display 250 to a right portion of the second display 250, on the second display 250.

As shown in panels 1711 through 1715, if the electronic device 101 is fully unfolded from the folding angle of panel 1711, the processor 460 may display images which move the second object 1720 from the right center portion of the first display 240 to a left center portion of the first display 240, on the first display 240.

In panels 1717 through 1723, the second housing 233 is tilted such that the lower portion of the second housing 233 is farther from the Earth while facing the Earth than the upper portion.

With the electronic device 101 fully folded, the processor 460 may display an image including a third object 1730 at the center of the second display 250 as shown in panel 1717.

While the electronic device 101 fully folded is unfolded to the third angle which is less than the folding angle of the diagram 1719, the processor 460 may display images which move the third object 1730 from the center of the second display 250 to a lower right portion of the second display 250, on the second display 250.

As shown in panels 1719 through 1723, while the electronic device 101 is fully unfolded from the folding angle of panel 1719, the processor 460 may display images which move the third object 1730 from the lower right portion of the first display 240 to an upper left portion of the first display 240, on the first display 240.

In FIG. 17, the processor 460 displays the images including, but is not limited to, the object which moves according to the status of the electronic device 101 in the unfolding operation. For example, the processor 460 may display images including a different visual effect based on the status of the electronic device 101, on at least one of the first display 240 or the second display 250 in the unfolding operation.

The unfolding operation is illustrated in FIG. 17 by way of example, but the folding operation may be applied in the identical or similar manner.

Figure 18:
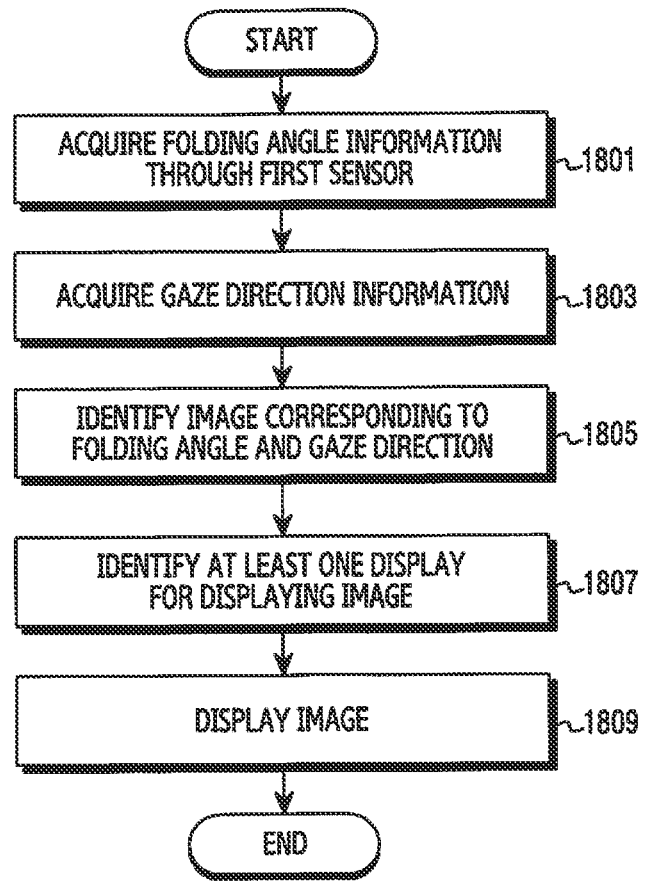
FIG. 18 illustrates a flowchart of a method for providing an image using a foldable display by considering a gaze direction according to an embodiment.

FIG. 18 is a flowchart of a method for providing an image using a foldable display by considering a gaze direction according to an embodiment.

Referring to FIG. 18, in step 1801, the processor 460 may acquire folding angle information through the first sensor 430.

Step 1801 is identical or similar at least in part to step 501 of FIG. 5 and, accordingly, its further detailed descriptions are omitted.

In step 1803, the processor 460 may acquire gaze direction information through the gaze detector 450.

The processor 460 may acquire a user's gaze direction information for the electronic device 101 from the gaze detector 450. For example, the processor 460 may acquire the user's face direction information for the electronic device 101 (e.g., the second housing 233) detected through the gaze detector 450.

In step 1805, the processor 460 may identify an image corresponding to the folding angle and the gaze direction.

The processor 460 may identify the image corresponding to the folding angle and the current gaze direction among a plurality of designated images stored in the memory 470 and corresponding to the folding angles and the gaze directions.

The designated images may be displayed in sequence (or in succession) according to the folding angle and the gaze direction, in the folding operation or the unfolding operation.

The designated images may be created by the designer of the electronic device 101 or the third party service provider. The designated images may be generated based on a user input.

The designated images may include images which dynamically change according to the change of the folding angle and the gaze direction.

The designated images may each include at least one object, and a visual representation of the at least one object may dynamically change while the folding angle increases or decreases and the gaze direction changes in the folding operation or the unfolding operation.

The designated images may include a visual effect which dynamically changes while the folding angle increases or decreases and the gaze direction changes in the folding operation or the unfolding operation.

In step 1807, the processor 460 may identify at least one display for displaying the image, based on at least one of the folding angle or the gaze direction.

Step 1807 is identical or similar at least in part to step 505 of FIG. 5 and, accordingly, its further detailed descriptions are omitted.

The processor 460 may identify at least one display for displaying the image based on the gaze direction.

For example, if the gaze direction faces away from the front surface direction of the second housing 233, the processor 460 may identify that the display for displaying the image at the first folding angle is the second display 250 and the first display 240. If the gaze direction faces to the left portion of the second housing 233 (e.g., the farthest portion from the hinge unit 235 in the second housing 233), the processor 460 may identify that the display for displaying the image at the second folding angle which is less than the first folding angle is the second display 250 and the first display 240. If the gaze direction faces to the left portion of the second housing 233 (e.g., the closest portion to the hinge unit 235 in the second housing 233), the processor 460 may identify that the display for displaying the image at the third folding angle which is greater than the first folding angle is the second display 250 and the first display 240.

For example, if the gaze direction faces away from the front surface direction of the second housing 233, the processor 460 may identify that the display for displaying the image at the fourth folding angle is the first display 240. If the gaze direction faces to the right portion of the second housing 233, the processor 460 may identify that the display for displaying the image at the fifth folding angle which is greater than the fourth folding angle is the first display 240. If the gaze direction faces to the left portion of the second housing 233, the processor 460 may identify that the display for displaying the image at the sixth folding angle which is less than the fourth folding angle is the first display 240.

In step 1809, the processor 460 may display the image on at least one display. For example, the processor 460 may display the image corresponding to the folding angle and the gaze direction on at least one of the first display 240 or the second display 250.

Step 1809 is identical or similar at least in part to step 507 of FIG. 5 and, accordingly, its further detailed descriptions are omitted.

The method for displaying the image dynamically changing according to the gaze direction may be identical or similar at least in part to the method for displaying the image dynamically changing according to the status of the electronic device 101 of FIG. 17. For example, if the user's gaze direction faces to the top end of the second display 250 and the first display 240, the plurality of the images may be displayed as shown in panels 1701 through 1707. For example, if the user's gaze direction faces to the middle of the second display 250 and the first display 240, the plurality of the images may be displayed as shown in panels 1709 through 1715. For example, if the user's gaze direction faces to the bottom of the second display 250 and the first display 240, the plurality of the images may be displayed as shown in panels 1717 through 1723.

Figure 19:
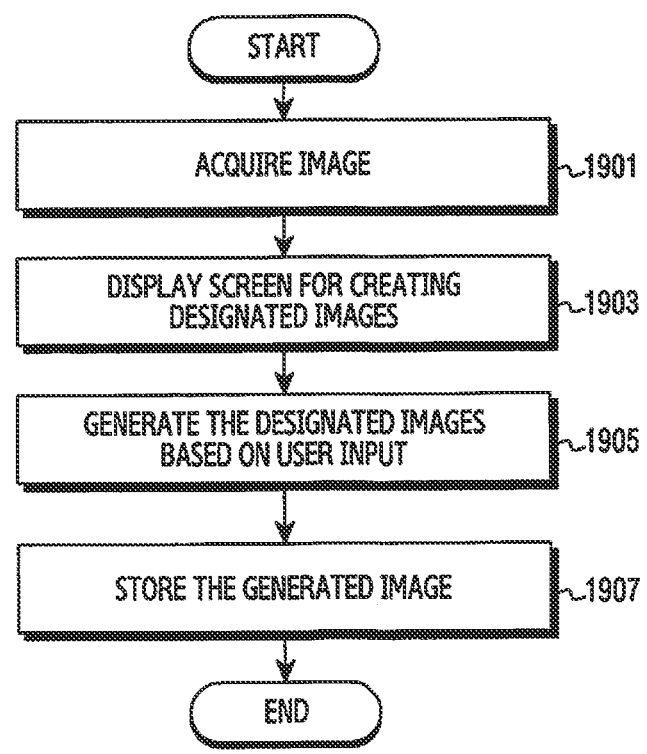
FIG. 19 illustrates a flowchart of a method for acquiring an image to be displayed during a folding operation or an unfolding operation, based on a user input according to an embodiment.

FIG. 19 is a flowchart of a method for acquiring an image to be displayed during a folding operation or an unfolding operation, based on a user input according to an embodiment.

Figure 20:
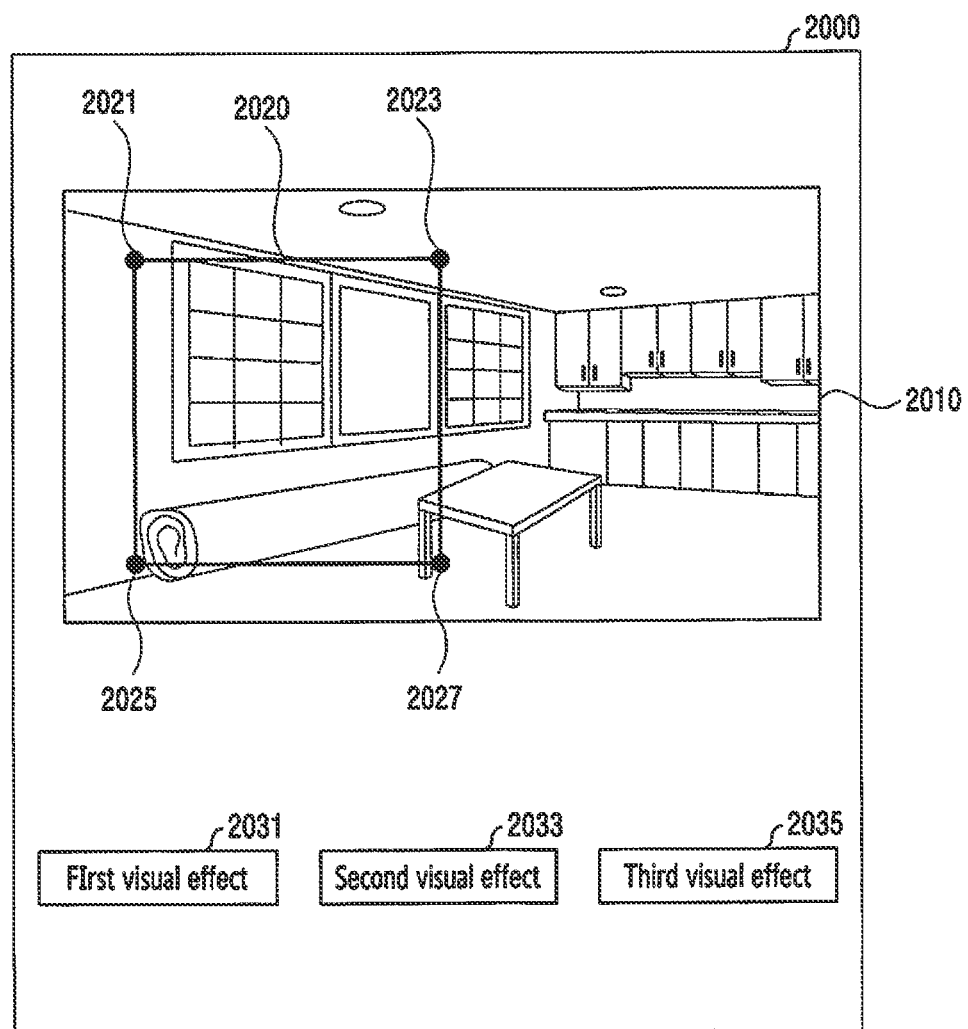
FIG. 20 is an illustration of a method for acquiring an image to be displayed during a folding operation or an unfolding operation, based on a user input according to an embodiment.

FIG. 20 is an illustration of a method for acquiring an image to be displayed during a folding operation or an unfolding operation, based on a user input according to an embodiment.

Referring to FIGS. 19 and 20, in step 1901, the processor 460 may acquire an image.

The processor 460 may acquire an original image by receiving from the user an input for acquiring the original image (or the basis for a plurality of designated images) to create a plurality of designated images. For example, using an application (e.g., a photo application or a gallery application), the processor 460 may acquire the original image by receiving a user input which selects the original image. For example, the processor 460 may acquire the original image by receiving a user input which captures (or screenshots) a running (or displayed) image on the second display 250 (or the first display 240). For example, the processor 460 may acquire the original image by receiving the original image from the external electronic device 101 through the communication module 190. However, the method for acquiring the original image is not limited thereto.

In step 1903, the processor 460 may display a screen for creating the designated images based on the original image, on the display (the second display 250 or the first display 240).

If acquiring the original image, the processor 460 may display a screen 2000 including an original image 2010 on the display (the second display 250 or the first display 240) as shown in FIG. 20.

The processor 460 may display a guide 2020 for creating the designated images in the original image on the display (the second display 250 or the first display 240).

In step 1905, the processor 460 may generate the designated images, based on a user input.

The processor 460 may receive a user input for moving the guide 2020. For example, the processor 460 may move the guide 2020 by receiving the input which touches and drags an area of the guide 2020.

The processor 460 may generate images (or image portions in the area of the guide 2020) displayed in the guide 2020 (included in the guide 2020), as the designated images while the guide 2020 moves. For example, the processor 460 may generate the images displayed in the guide 2020 as the designated images while the guide 2020 moves, wherein the images displayed in the guide 2020 correspond to the folding angles, respectively, while the guide 2020 moves.

The processor 460 may receive a user input for magnifying or reducing the guide 2020. For example, the processor 460 may magnify or reduce the guide 2020, by receiving an input which touches and drags at least one of vertexes 2021 through 2027 of the guide 2020.

The processor 460 may generate images (or image portions in the area of the guide 2020) displayed in the guide 2020 while the guide 2020 is magnified or reduced, as the designated images. For example, the processor 460 may generate the images displayed in the guide 2020, as the designated images while the guide 2020 is magnified or reduced, wherein the images displayed in the guide 2020 while the guide 2020 is magnified or reduced correspond to the folding angles, respectively.

Based on the user input, the processor 460 may set (or change) a width to height ratio (or a height to width ratio) of the guide 2020.

Based on the user input, the processor 460 may generate the designated images including a visual effect.

The processor 460 may receive an input which selects at least one of objects 2031 through 2035. The processor 460 may generate the designated images including the visual effect corresponding to the selected object.

The object (e.g., the object 2031) may add the visual effect to the original image. For example, if the object 2031 is selected, the processor 460 may generate a plurality of images with the visual effect added to the original image, as shown in FIG. 12.

The object (e.g., the object 2033) may generate the designated images including a visual effect irrelevant to the original image. For example, if the object 2033 is selected, the processor 460 may generate the designated images including the visual effect irrelevant to the original image, as shown in FIG. 7, FIG. 9, FIG. 10, or FIG. 11.

In step 1907, the processor 460 may store the generated image in the memory 470. For example, the processor 460 may store the generated images in the memory 470.

In FIG. 19 and FIG. 20, the original image is acquired and then the designated images are generated, but is not limited to, based on the user input. If acquiring the original image, the processor 460 may generate the designated images, using a designated method, without the user input (e.g., automatically). For example, in response to capturing a first image displayed on the second display 250, the processor 460 may generate the designated images, to sequentially magnify the first image at the folding angle ranging from the first angle to the second angle and to sequentially reduce the first image at the folding angle ranging from the second angle to the third angle.

A method according to an embodiment may include acquiring folding angle information through a first sensor which detects the folding angle formed if a first housing and a second housing of an electronic device rotate based on a hinge unit, identifying an image corresponding to the folding angle among a plurality of first images corresponding to a plurality of folding angles respectively, based on the folding angle, identifying at least one display for displaying the image, among a first display exposed to outside through a first area of the first housing and a second area of the second housing and a second display exposed to the outside through a third area, which faces away from the first area, of the first housing, and displaying the image on the at least one display.

The first images may include a plurality of images which dynamically change based on the folding angle.

The first images may include a plurality of images including at least one object which dynamically changes based on the folding angle or a visual effect.

Identifying the at least one display may include, if the folding angle ranges from a first angle to a second angle, identifying the second display as the display for displaying the image, and if the folding angle ranges from the second angle to a third angle, identifying the first display as the display for displaying the image.

Identifying the at least one display may include, if the folding angle ranges from a fourth angle to a fifth angle, identifying the second display as the at least one display for displaying the image, if the folding angle ranges from the fifth angle to a sixth angle, identifying the first display and the second display as the at least one display for displaying the image, and if the folding angle ranges from the sixth angle to a seventh angle, identifying the first display as the at least one display for displaying the image.

The method may further include acquiring angle information of the electronic device in relation to facing the Earth, from a second sensor which detects an angle of the electronic device in relation to facing the Earth, identifying an image corresponding to the folding angle and the angle of the electronic device, among the second images corresponding to the folding angles and angles of the electronic device in relation to facing the Earth, and displaying the image corresponding to the folding angle and the angle of the electronic device, on the at least one display.

The method may further include acquiring gaze direction information from a gaze detector which detects a gaze direction of a user, identifying an image corresponding to the folding angle and the gaze direction, among a plurality of third images corresponding to the folding angles and gaze directions, and displaying the image corresponding to the folding angle and the gaze direction, on the at least one display.

The method may further include generating the first images, based on a user input.

Generating the first images based on the user input may include acquiring an original image, displaying the original image on the first display or the second display, and generating the first images, based on a user input for the original image.

Figure 21:
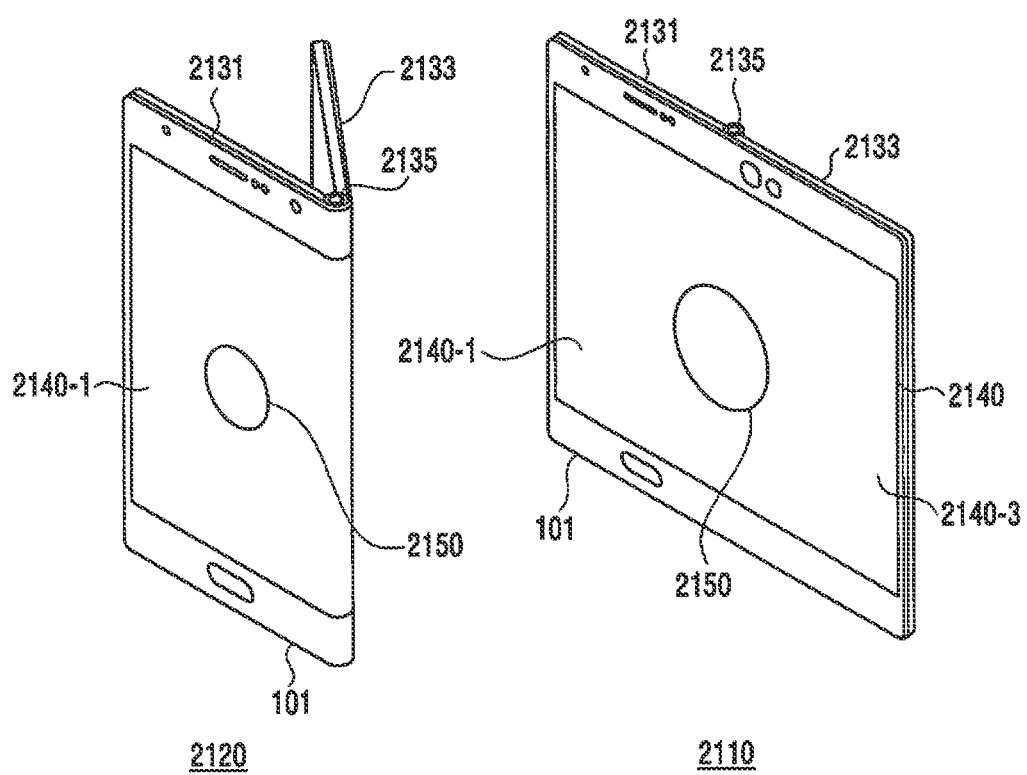
FIG. 21 is an illustration of a method for providing an image using a foldable display of an fully unfolded type according to an embodiment.

FIG. 21 is an illustration of a method for providing an image using a foldable display of a fully unfolded type according to an embodiment.

Referring to FIG. 21, panel 2110 shows the electronic device 101 which is unfolded, and panel 2120 shows the electronic device 101 which is folded out.

The electronic device 101 may include a first housing 2131, a second housing 2133, a hinge unit 2135, and a first display 2140.

The first housing 2131 and the second housing 2133 may be coupled. For example, one side of the first housing 2131 and one side of the second housing 2133 may be coupled. The first housing 2131 and the second housing 2133 may be coupled by the hinge unit 2135. The first housing 2131 and the second housing 2133 may be coupled pivotably or rotatably based on the hinge unit 2135.

The first display 2140 may be exposed to the outside through a first area of the first housing 2131 and a second area of the second housing 2133. For example, the first display 2140 may be disposed on the first housing 2131 and the second housing 2133 across the hinge unit 2135.

The first display 2140 may be a foldable display. In an embodiment, the first display 2140 may be folded or unfolded by rotating the first housing 2131 and the second housing 2133 based on the hinge unit 2135.

The electronic device 101 may further include a second display which faces away from the first area of the first housing 2131 or a third display which faces away from the second area of the second housing 2133.

In the folding operation or the unfolding operation, the processor may display an image which dynamically changes, on the first display 2140.

In the folding operation (e.g., from the status of the electronic device 101 of panel 2110 to the status of the electronic device 101 of panel 2120), the processor may display an image including an object 2150 which moves in response to the folding angle, on the first display 2140. For example, as shown in panel 2110, the processor may display the object 2150 of the image at the center of the first display 2140 while the electronic device 101 is fully unfolded. While the electronic device 101 is folded, the processor may move the object 2150 to the center of a 1-1 display 2140-1, on at least one of the 1-1 display 2140-1 and a 1-2 display 2140-3. The images displayed on at least one of the 1-1 display 2140-1 or the 1-2 display 2140-3 in the folding operation or the unfolding operation are not limited thereto.

The processor may display an image which dynamically changes on the first display 2140 according to the folding angle, the status of the electronic device 101 (e.g., the angle of the electronic device 101 in relation to facing the Earth) or the user's gaze direction. The method for displaying the image which dynamically changes on the first display 2140 according to the folding angle, the status of the electronic device 101 (e.g., the angle of the electronic device 101 in relation to facing the Earth) or the user's gaze direction is identical or similar at least in part to the method described above with reference to FIG. 16 through FIG. 18 and, thus, the details thereof are omitted.

Based on a user input, the processor may acquire an image to display in the folding operation or the unfolding operation. The method for acquiring the image to display in the folding operation or the unfolding operation based on the user input is identical or similar at least in part to the method described above with reference to FIG. 19 and FIG. 20 and, thus, the details thereof are omitted.

In the electronic device 101 which further includes at least one of the second display which faces away from the first area of the first housing 2131 or the third display which faces away from the second area of the second housing 2133, the method for displaying the image which dynamically changes according to the folding angle is identical or similar at least in part to the method described above with reference to FIG. 1 through FIG. 20 and, thus, the details thereof are omitted.

Figure 22:
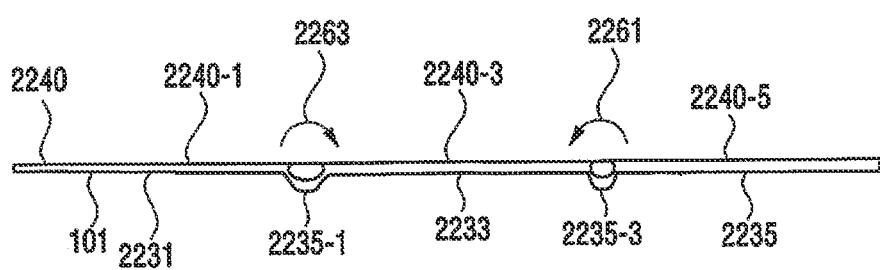
FIG. 22 is an illustration of a method for providing an image using a foldable display including a plurality of hinge units according to an embodiment.
Figure 23:
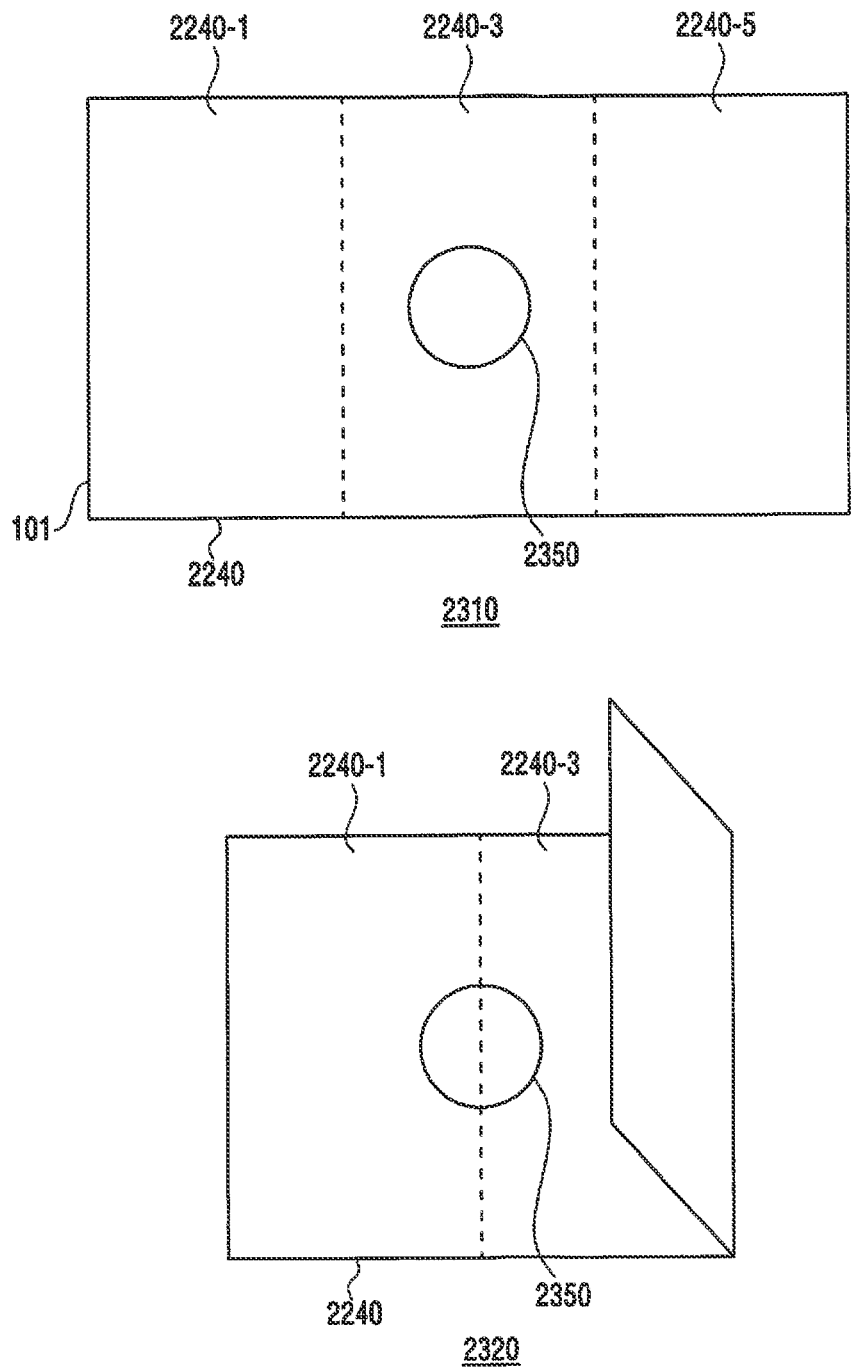
FIG. 23 is an illustration of a method for providing an image using a foldable display including a plurality of hinge units according to an embodiment.

FIG. 22 and FIG. 23 are illustrations of a method for providing an image using a foldable display including a plurality of hinge units according to an embodiment.

Referring to FIG. 22 and FIG. 23, the electronic device 101 includes a plurality of hinge units and is unfolded in FIG. 22.

The electronic device 101 may include a first housing 2231, a second housing 2233, a third housing 2235, a first hinge unit 2235-1, a second hinge unit 2235-3, and a first display 2240.

The first housing 2231 and the second housing 2233 may be coupled. For example, one side of the first housing 2231 and one side of the second housing 2233 may be coupled, and the other side of the second housing 2233 and one side of the third housing 2235 may be coupled. The first housing 2231 and the second housing 2233 may be coupled by the first hinge unit 2235-1, and the second housing 2233 and the third housing 2235 may be coupled by the second hinge unit 2235-3. The first housing 2231 and the second housing 2233 may be coupled pivotably or rotatably based on the first hinge unit 2235-1, and the second housing 2233 and the third housing 2233 may be coupled pivotably or rotatably based on the second hinge unit 2235-3.

The electronic device 101 fully unfolded may be fully folded by fully folding the second housing 2233 and the third housing 2235 based on the second hinge unit 2235-3 along an arrow 2261 and fully folding the first housing 2231 and the second housing 2233 based on the first hinge unit 2235-1 along an arrow 2263.

The first display 2240 may be exposed to the outside through a first area of the first housing 2231, a second area of the second housing 2233, and a third area of the third housing 2235. For example, the first display 2240 may be disposed on the first housing 2231, the second housing 2233, and the third housing 2235 across the first hinge unit 2235-1 and the second hinge unit 2235-3.

The first display 2240 may be a foldable display. The first display 2240 may be folded or unfolded by rotating the first housing 2231 and the second housing 2233 based on the first hinge unit 2235-1, or by rotating the second housing 2233 and the third housing 2235 based on the second hinge unit 2235-3.

The electronic device 101 may further include at least one of a second display which faces away from the first area of the first housing 2231, a third display which faces away from the second area of the second housing 2233, or a fourth display which faces away from the third area of the third housing 2235.

In the folding operation or the unfolding operation, the processor may display an image which dynamically changes, on the first display 2240.

In the folding operation (e.g., from the status of the electronic device 101 of panel 2310 to the status of the electronic device 101 of panel 2320), the processor may display an image including an object 2350 which moves in response to the folding angle, on the first display 2240. For example, as shown in panel 2310, the processor may display the object 2350 of the image at the center of the first display 2240 while the electronic device 101 is fully unfolded. While the second housing 2233 and the third housing 2235 are folded, the processor may move the object 2350 to the center of a 1-1 display 2240-1 and a 1-2 display 2240-3, on at least one of the 1-1 display 2240-1, the 1-2 display 2240-3, or a 1-3 display 2240-5. The images displayed on at least one of the 1-1 display 2240-1, the 1-2 display 2240-3, or a 1-3 display 2240-5 in the folding operation or the unfolding operation are not limited thereto.

The processor may display an image which dynamically changes, on the first display 2240 according to the folding angle, the status of the electronic device 101 (e.g., the angle of the electronic device 101 in relation to facing the Earth) or the user's gaze direction. The method for displaying the image which dynamically changes on the first display 2240 according to the folding angle, the status of the electronic device 101 (e.g., the angle of the electronic device 101 in relation to facing the Earth) or the user's gaze direction is identical or similar at least in part to the method described above with reference to FIG. 16 through FIG. 18 and, thus, the details thereof are omitted.

Based on a user input, the processor may acquire an image to display in the folding operation or the unfolding operation. The method for acquiring the image to display in the folding operation or the unfolding operation based on the user input is identical or similar at least in part to the method described with reference to FIG. 19 and FIG. 20 and, thus, the details thereof are omitted.

In the electronic device 101 which further includes at least one of the second display which faces away from the first area of the first housing 2231, the third display which faces away from the second area of the second housing 2233, or the fourth display which faces away from the third area of the third housing 2235, the method for displaying the image which dynamically changes according to the folding angle is identical or similar at least in part to the method described above with reference to FIG. 1 through FIG. 20 and, thus, the details thereof are omitted here.

Figure 24:
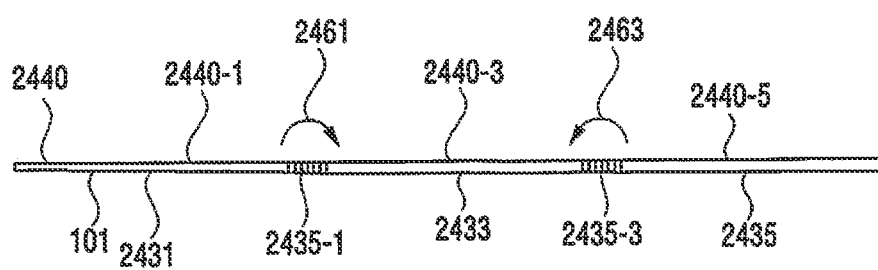
FIG. 24 is an illustration of a method for providing an image using a foldable display including a plurality of hinge units according to an embodiment.
Figure 25:
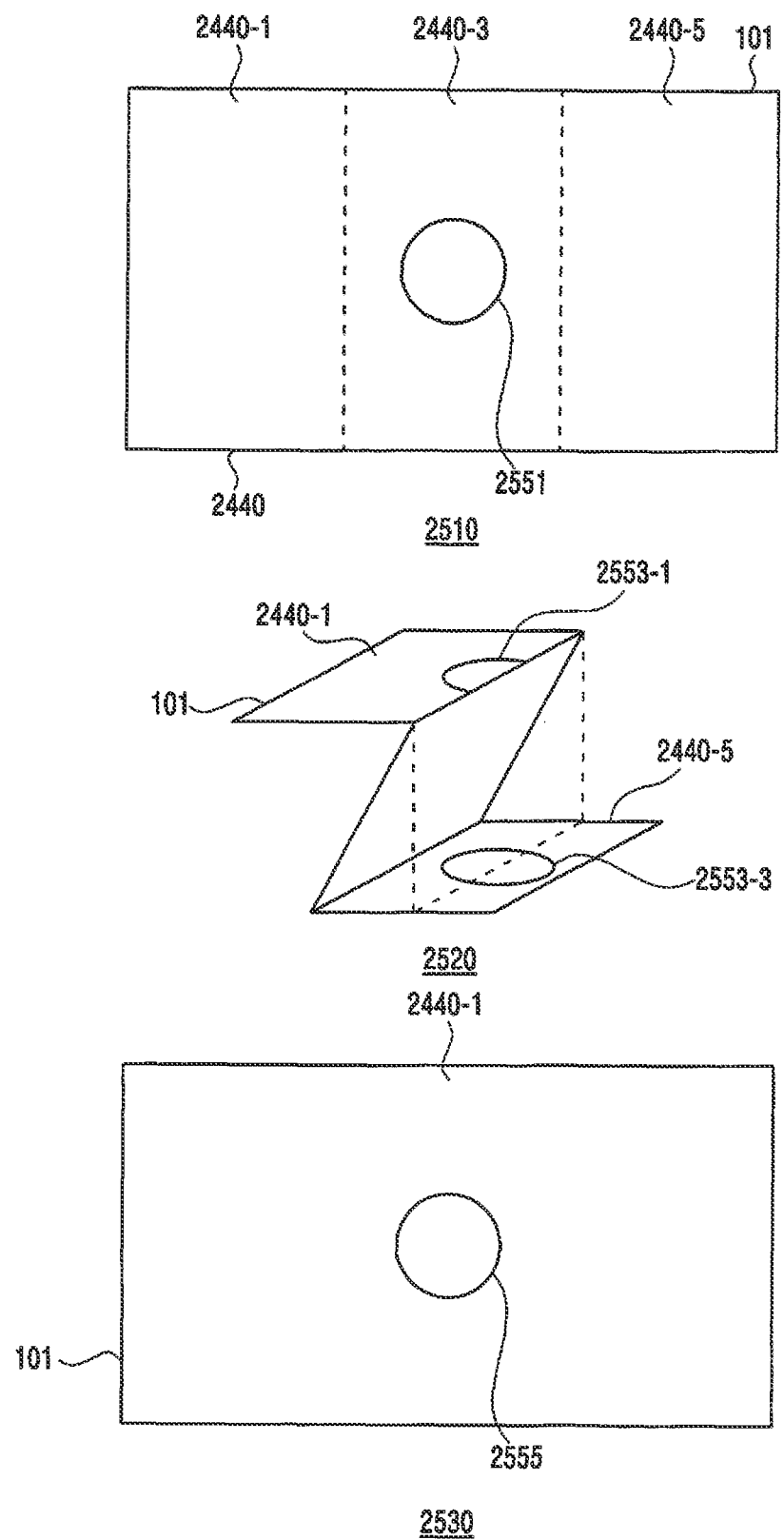
FIG. 25 is an illustration of a method for providing an image using a foldable display including a plurality of hinge units according to an embodiment.

FIG. 24 and FIG. 25 are illustrations of a method for providing an image using a foldable display including a plurality of hinge units according to an embodiment.

Referring to FIG. 24 and FIG. 25, the electronic device 101 includes a plurality of hinge units and is unfolded.

The electronic device 101 may include a first housing 2431, a second housing 2433, a third housing 2435, a first hinge unit 2435-1, a second hinge unit 2435-3, and a first display 2440.

The first housing 2431 and the third housing 2435 may be coupled. For example, one side of the first housing 2431 and one side of the second housing 2433 may be coupled, and the other side of the second housing 2433 and one side of the third housing 2435 may be coupled. The first housing 2431 and the second housing 2433 may be coupled by the first hinge unit 2435-1, and the second housing 2433 and the third housing 2435 may be coupled by the second hinge unit 2435-3. The first housing 2431 and the second housing 2433 may be coupled pivotably or rotatably based on the first hinge unit 2435-1, and the second housing 2433 and the third housing 2435 may be coupled pivotably or rotatably based on the second hinge unit 2435-3.

The electronic device 101 fully unfolded may fold the first housing 2431 and the second housing 2433 based on the first hinge unit 2435-1 along an arrow 2461 and fold the second housing 2433 and the third housing 2435 based on the second hinge unit 2435-3 along an arrow 2463.

The first display 2440 may be exposed to the outside through a first area of the first housing 2431, a second area of the second housing 2433, and a third area of the third housing 2435. For example, the first display 2440 may be disposed on the first housing 2431, the second housing 2433, and the third housing 2435 across the first hinge unit 2435-1 and the second hinge unit 2435-3.

The first display 2440 may be a foldable display. The first display 2440 may be folded or unfolded by rotating the first housing 2431 and the second housing 2433 based on the first hinge unit 2435-1, or by rotating the second housing 2433 and the third housing 2435 based on the second hinge unit 2435-3.

The electronic device 101 may further include at least one of a second display which faces away from the first area of the first housing 2431, a third display which faces away from the second area of the second housing 2433, or a fourth display which faces away from the third area of the third housing 2435.

In the folding operation or the unfolding operation, the processor may display an image which dynamically changes, on the first display 2440.

In the folding operation (e.g., from the status of the electronic device 101 of panel 2510 to the status of the electronic device 101 of panel 2530), the processor may display an image including an object which moves in response to the folding angle, on the first display 2440. For example, as shown in panel 2510, the processor may display an object 2551 of the image at the center of the first display 2440 while the electronic device 101 is fully unfolded. While the first housing 2431 and the second housing 2433 are folded based on the first hinge unit 2435-1 and the second housing 2433 and the third housing 2435 are folded based on the second hinge unit 2435-3, the processor may display the object which is moving, on at least one of a 1-1 display 2440-1, a 1-2 display 2440-3, or a 1-3 display 2440-5. For example, as shown in panel 2520, if the first housing 2431 and the second housing 2433 form the first folding angle and the second housing 2433 and the third housing 2435 form the second folding angle, the processor may display an object 2553-1 and an object 2553-3 on the 1-1 display 2440-1 and the 1-3 display 2440-5, as if the user views the object indicating the single Moon (or the same Moon) on the 1-1 display 2440-1 and the 1-3 display 2440-5. With the first housing 2431, the second housing 2433, and the third housing 2435 fully folded, the processor may display an object 2555 at the center of the 1-1 display 2440-1, on the 1-1 display 2440-1.

The images displayed on at least one of the 1-1 display 2440-1, the 1-2 display 2440-3, or the 1-3 display 2440-5 in the folding operation or the unfolding operation are not limited thereto.

The processor may display an image which dynamically changes, on the first display 2440 according to the folding angle, the status of the electronic device 101 (e.g., the angle of the electronic device 101 in relation to facing the Earth) or the user's gaze direction. The method for displaying the image which dynamically changes on the first display 2440 according to the folding angle, the status of the electronic device 101 (e.g., the angle of the electronic device 101 in relation to facing the Earth) or the user's gaze direction is identical or similar at least in part to the method described above with reference to FIG. 16 through FIG. 18 and, thus, details thereof are omitted.

Based on a user input, the processor may acquire an image to display in the folding operation or the unfolding operation. The method for acquiring the image to display in the folding operation or the unfolding operation based on the user input is identical or similar at least in part to the method described above with reference to FIG. 19 and FIG. 20 and, thus, details thereof are omitted.

In the electronic device 101 which further includes at least one of the second display which faces away from the first area of the first housing 2431, the third display which faces away from the second area of the second housing 2433, or the fourth display which faces away from the third area of the third housing 2435, the method for displaying the image which dynamically changes according to the folding angle is identical or similar at least in part to the method described above with reference to FIG. 1 through FIG. 20 and, thus, details thereof are omitted.

Figure 26:
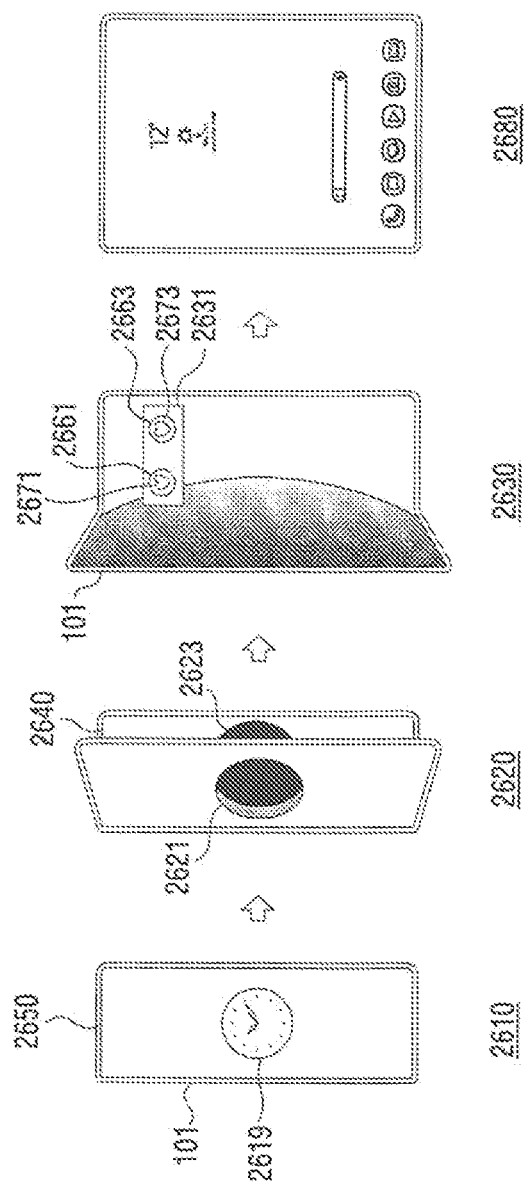
FIG. 26 is an illustration of a method for providing a screen for user authentication using a foldable display according to an embodiment.

FIG. 26 is an illustration of a method for providing a screen for user authentication using a foldable display according to an embodiment.

Referring to FIG. 26, in the unfolding operation, the processor 460 may display a screen for the user authentication using a first display.

While the folding angle switches to the first angle in the electronic device 101 fully folded, the processor 460 may display objects 2619, 2621, and 2623 which dynamically change, on at least one of a first display 2640 and a second display 2650 as shown in panels 2610 and 2630.

If the folding angle of the electronic device 101 ranges from the second angle to the third angle (e.g., the angles of the fully unfolded state), the processor 460 may perform the user authentication. For example, if the folding angle is the second angle, the processor 460 may activate a camera (e.g., the camera module 180) and capture a user's iris for the user authentication. While the folding angle ranges from the second angle to the third angle, as shown in panel 2630, the processor 460 may continuously acquire user iris information through the camera. Based on the acquired user iris information, the processor 460 may display objects 2661 and 2663 indicating the user's eyes at positions of the user's eyes, on a screen 2631 of the first display 2640. The processor 460 may further display guides 2661 and 2663 for guiding the user to place his/her eyes (or the objects 2671 and 2673) to designated positions, to acquire more accurate user iris information, on the screen 2631 of the first display 2640. However, the method for displaying the objects 2671 and 2673 indicating the user's eyes and the guides 2661 and 2663 is not limited thereto.

If the authentication based on the iris information is successful, as shown in panel 2680, the processor 460 may display an unlock screen on the first display 2640 in the electronic device 101 fully unfolded. Although not depicted in panel 2680, in an embodiment, if the authentication based on the iris information is successful, the processor 460 may display an image indicating the authentication success on the first display 2640. For example, the processor 460 may display a text indicating the authentication success or change a shape or a color of the object 2671 and 2673, on the first display 2640.

If the authentication based on the iris information fails, the processor 460 may display an image indicating the authentication failure. For example, the processor 460 may display a text indicating the authentication failure or change the shape or the color of the objects 2671 and 2673, on the first display 2640. For example, the processor 460 may display an image (or a text) for moving (or adjusting) the user's eye position such that the position of the object corresponds to the position of the guide for the sake of the authentication, on the first display 2640.

In FIG. 26, the user is authenticated based on, but is not limited to, the user iris information. For example, the method of FIG. 26 may be applied to the user authentication based on user face (or facial feature) information in the identical or similar manner.

An electronic device according to an embodiment of the present disclosure may include a plurality of housings, at least one hinge unit for rotating the housings, a display exposed to outside through the housings, a sensor for detecting at least one folding angle formed between the housings, a memory for storing a plurality of images corresponding to a plurality of folding angles respectively, and at least one processor, wherein the at least one processor may be configured to acquire information of the at least one folding angle, through the sensor, identify an image corresponding to the at least one folding angle among the plurality of the images, identify at least one of portions of the display for displaying the image, based on the at least one folding angle, and display the image through the at least one portion.

The images may include a plurality of images which dynamically change based on the at least one folding angle.

A data structure used in an embodiment of the present disclosure may be recorded in a non-transitory computer-readable recording medium through various means. The non-transitory computer-readable recording medium includes a storage medium such as a magnetic storage medium (e.g., a ROM, a floppy disk, a hard disk) optical and a recording medium (e.g., a CD-ROM, or a digital versatile disk (DVD)).

The non-transitory computer-readable recording medium may store, in an electronic device, a program for acquiring folding angle information through a first sensor which detects the folding angle formed if a first housing and a second housing of an electronic device rotate based on a hinge unit, identifying an image corresponding to the folding angle among a plurality of first images corresponding to a plurality of folding angles respectively, based on the folding angle, identifying at least one display for displaying the image, among a first display exposed to outside through a first area of the first housing and a second area of the second housing and a second display exposed to the outside through a third area, which faces away from the first area, of the first housing, and displaying the image on the at least one display.

A method for providing an image using a foldable display and an electronic device supporting the same according to an embodiment of the present disclosure may provide an image which dynamically changes, using a plurality of displays (or different portions of the foldable display) while the electronic device is folded or unfolded, thus providing improved user experience.

The present disclosure has been shown and described with reference to exemplary embodiments thereof. It will be understood by those skilled in the art that various changes in form and details may be made therein without departing from the scope of the present disclosure as defined by the appended claims and their equivalents. Therefore, the described embodiments should be considered in descriptive sense only and not for purposes of limitation. All differences within the equivalent scope are intended to be construed as being included in the present disclosure.

What is claimed is:

1. An electronic device, comprising:
a housing including a first housing and a second housing;
a hinge unit configured to rotate the first housing and the second housing, the housing configured to move between a folded state and an unfolded state via the hinge unit;
a first display disposed in a first area of the first housing and a second area of the second housing;
a second display disposed in a third area of the first housing, located at an opposite side of the first area;
at least one sensor;
a memory configured to store an image frame set including a plurality of image frames including images of for visually showing dynamic changes with respect to an object; and
at least one processor;
wherein the memory stores instructions which, when executed, cause the at least one processor to:
obtain, via the at least one sensor, information corresponding to a folding angle between the first housing and the second housing,
based on the obtained information corresponding to a first folding angle smaller than a first reference angle, control to deactivate the first display and control to display, via the second display, at least one image frame included in the plurality of image frames to visually show the object corresponding to the image frame set,
based on the obtained information corresponding to a second folding angle greater than the first reference angle, control to deactivate the second display and control to activate the first display, and
based on the obtained information corresponding to a folding angle increasing from the second folding angle to a third folding angle, control to display, via the first display, image frames of the image frame set to visually show dynamic changes with respect to the object, as a continuation of the object displayed on the second display, corresponding to a plurality of folding angles between the second folding angle to the third folding angle.

2. The electronic device of claim 1,
wherein each of the image frames included in the image frame set is displayed as the wallpaper of a home screen.

3. The electronic device of claim 1,
wherein the plurality of image frames included in the image frame set are configured to provide an image of an object which dynamically changes based on folding angles changing between the second folding angle to the third folding angle.

4. The electronic device of claim 1,
wherein the plurality of image frames included in the image frame set are configured to provide an image of an object which dynamically changes in size based on folding angles changing between the second folding angle to the third folding angle.

5. The electronic device of claim 1,
wherein the plurality of image frames included in the image frame set are configured to provide an image of an object which dynamically changes in shape based on folding angles changing between the second folding angle to the third folding angle.

6. The electronic device of claim 1,
wherein the plurality of image frames included in the image frame set are configured to provide an image of an object which dynamically changes in position based on folding angles changing between the second folding angle to the third folding angle.

7. The electronic device of claim 1 wherein the instructions further cause the at least one processor to:
based on the obtained information corresponding to the second folding angle being greater than the first reference angle, deactivate the second display and display, via the first display, the first image frame included in the image frame set corresponding to the second folding angle.

8. The electronic device of claim 1, wherein the instructions further cause the at least one processor to:
based on the obtained information corresponding to a fourth folding angle being greater than a second reference angle, display, via the first display, the second image frame included in the image frame set.

9. The electronic device of claim 1, wherein the instructions further cause the at least one processor to:
as the folding angle of the obtained information increases from the second folding angle to the third folding angle, sequentially display, via the first display, the image frames included in the image frame set.

10. The electronic device of claim 1,
wherein a portion of the first image frame displayed in the second display corresponds to a portion of one of the image frames displayed in the second area of the first display.

11. The electronic device of claim 1,
wherein the image frames displayed in the first display based on the folding angle between the second folding angle and the third folding angle are comprised of a plurality of image frames of the same object at different times, and
wherein the plurality of image frames are included in the image frame set.

12. The electronic device of claim 1, wherein the instructions further cause the at least one processor to:
acquire an input for capturing one of the image frames displayed in the first display, and
determine the captured one as the image frame to be displayed in the second display.

13. The electronic device of claim 1, wherein the instructions further cause the at least one processor to:
wherein the image frames displayed in the first display are overlaid with at least one display object.

14. A method of operating an electronic device, the method comprising:
obtaining, via at least one sensor of the electronic device, information corresponding to a folding angle between a first housing and a second housing of the electronic device, the first housing and the second housing rotatable about a hinge unit and configured to move between a folded state and an unfolded state via the hinge unit;
obtaining, via a memory of the electronic device, an image frame set including a plurality of image frames including images for visually showing dynamic changes with respect to an object;
based on the obtained information corresponding to a first folding angle smaller than a first reference angle, deactivating a first display and displaying, via a second display, at least one image frame included in a plurality of image frames to visually show the object corresponding to the image frame set,
based on the obtained information corresponding to a second folding angle greater than the first reference angle, deactivating the second display and activating the first display; and
based on the obtained information corresponding to a folding angle increasing from the second folding angle to a third folding angle, displaying, via the first display, image frames of the image frame set to visually show dynamic changes with respect to the object, as a continuation of the object displayed on the second display, corresponding to a plurality of folding angles between the second folding angle to the third folding angle.

15. The method of claim 14, the method comprising:
wherein each of the image frames included in the image frame set is displayed as the wallpaper of a home screen.

16. The method of claim 14, the method comprising:
wherein the plurality of image frames included in the image frame set are configured to provide an image of an object which dynamically changes based on folding angles changing between the second folding angle to the third folding angle.

17. The method of claim 14, the method comprising:
wherein the plurality of image frames included in the image frame set are configured to provide an image of an object which dynamically changes in size based on folding angles changing between the second folding angle to the third folding angle.

18. The method of claim 14, the method comprising:
wherein the plurality of image frames included in the image frame set are configured to provide an image of an object which dynamically changes in shape based on folding angles changing between the second folding angle to the third folding angle.

19. The method of claim 14, the method comprising:
wherein the plurality of image frames included in the image frame set are configured to provide an image of an object which dynamically changes in position based on folding angles changing between the second folding angle to the third folding angle.

20. The method of claim 14, the method comprising:
based on the obtained information corresponding to the second folding angle being greater than the first reference angle, deactivating the second display and displaying, via the first display, a first image frame included in the image frame set, the first image frame corresponding to the second folding angle.

* * * * *